(12) United States Patent
Takahashi et al.

(10) Patent No.: US 9,816,650 B2
(45) Date of Patent: Nov. 14, 2017

(54) PIPE JOINT

(75) Inventors: Kiyokazu Takahashi, Kawachinagano (JP); Hiroshi Inoue, Kawachinagano (JP); Yousuke Matsushita, Kawachinagano (JP); Tamotsu Takada, Kawachinagano (JP)

(73) Assignee: HIGASHIO MECH CO., LTD., Kawachinagano-shi (JP)

( * ) Notice: Subject to any disclaimer, the term of this patent is extended or adjusted under 35 U.S.C. 154(b) by 685 days.

(21) Appl. No.: 14/346,028

(22) PCT Filed: Jun. 5, 2012

(86) PCT No.: PCT/JP2012/064465
§ 371 (c)(1),
(2), (4) Date: Mar. 20, 2014

(87) PCT Pub. No.: WO2013/105287
PCT Pub. Date: Jul. 18, 2013

(65) Prior Publication Data
US 2014/0239631 A1    Aug. 28, 2014

(30) Foreign Application Priority Data
Jan. 10, 2012   (JP) ................................ 2012-001973

(51) Int. Cl.
*F16L 33/10* (2006.01)
*F16L 33/02* (2006.01)

(52) U.S. Cl.
CPC ............... *F16L 33/10* (2013.01); *F16L 33/02* (2013.01)

(58) Field of Classification Search
CPC . F16L 33/02; F16L 33/03; F16L 33/10; F16L 33/00; F16L 33/22; F16L 33/222; F16L 33/20; Y10T 24/1439
See application file for complete search history.

(56) References Cited

U.S. PATENT DOCUMENTS

| 235,931   | A | * | 12/1880 | Broughton | ............ F16L 33/02 |
| | | | | | 24/22 |
| 2,183,175 | A | * | 12/1939 | Tetzlaff   | ............ F16L 33/10 |
| | | | | | 24/278 |

(Continued)

FOREIGN PATENT DOCUMENTS

| DE | 510764 C  | * | 10/1930 | ............ F16L 33/03 |
| GB | 500701 A  | * | 2/1939  | ............ F16L 33/03 |
| GB | 1081156 A | * | 8/1967  | ............ F16L 33/10 |

*Primary Examiner* — David E Bochna
*Assistant Examiner* — James A Linford
(74) *Attorney, Agent, or Firm* — Kratz, Quintos & Hanson, LLP

(57) ABSTRACT

A pipe joint with which loss of rotational force added by electric tools or man power is made remarkably small, and a fastening ring can be diminished with small torque, plural fastening rings 6 vertically wound for a predetermined center angle of 360° to 480°, a guiding member 8 holding the fastening rings 6 as to restrict falling of the fastening rings 6 and allow diminishing deformation, an approximately triangular toggle member 11 disposed to protrude in a radial outer direction from the fastening rings 6 in a pipe unconnected state, and a bolt-nut connection X for moving a central peak portion of a toggle member 11 in a radial inner direction as to reduce a height dimension of the toggle member 11, are provided.

7 Claims, 31 Drawing Sheets

(56) References Cited

U.S. PATENT DOCUMENTS

| | | | | |
|---|---|---|---|---|
| 2,194,317 A | * | 3/1940 | O3 Neill | F16L 33/03 24/270 |
| 2,194,318 A | * | 3/1940 | Cox | F16L 33/03 24/270 |
| 2,816,338 A | * | 12/1957 | Klancnik, Jr. | F16L 33/02 24/27 |
| 2,849,770 A | * | 9/1958 | Klancnik, Jr. | F16L 33/03 24/27 |
| 3,694,869 A | * | 10/1972 | Matsuura | F16L 33/10 24/278 |
| 4,397,485 A | * | 8/1983 | Wood | F16L 17/025 285/111 |

* cited by examiner

FIG. 21
(A)
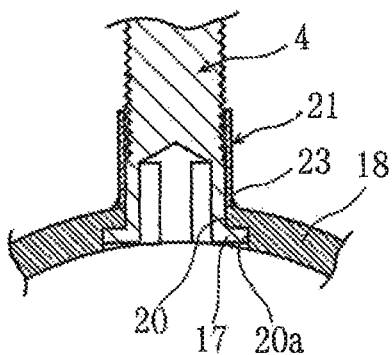
(B)
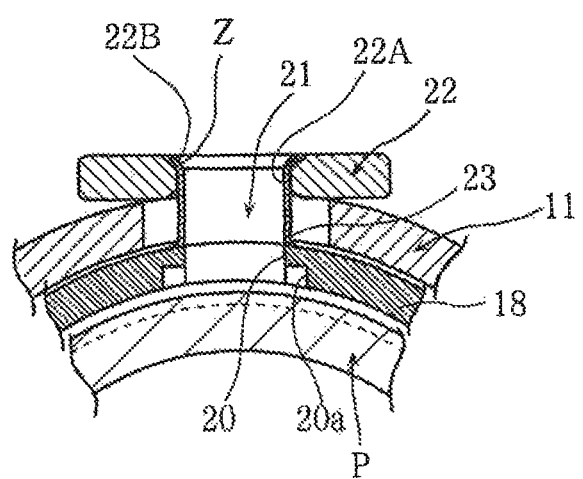

FIG. 22
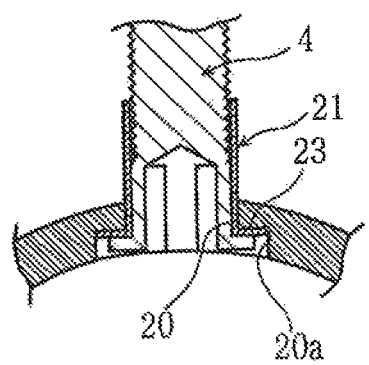
(A)
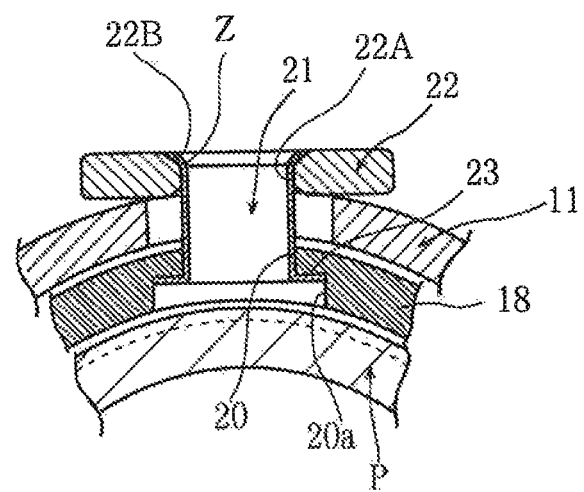
(B)

FIG. 32
(A) 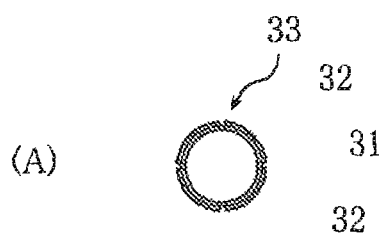
(B) 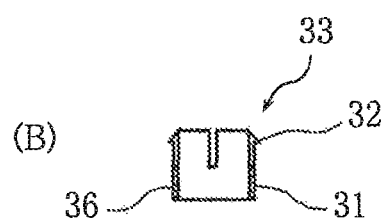
FIG. 33
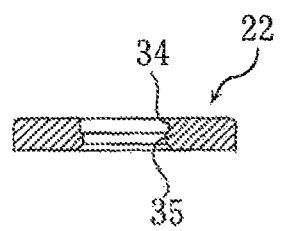

FIG. 38
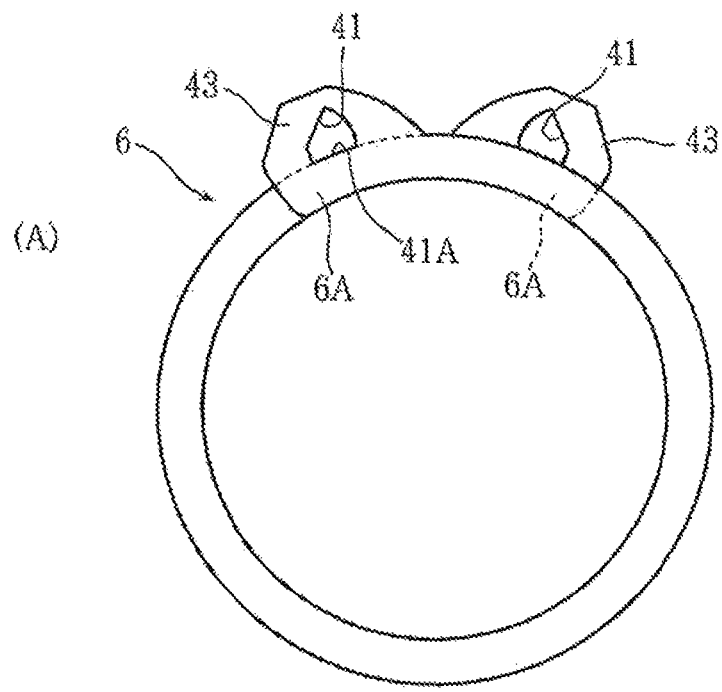
(A)
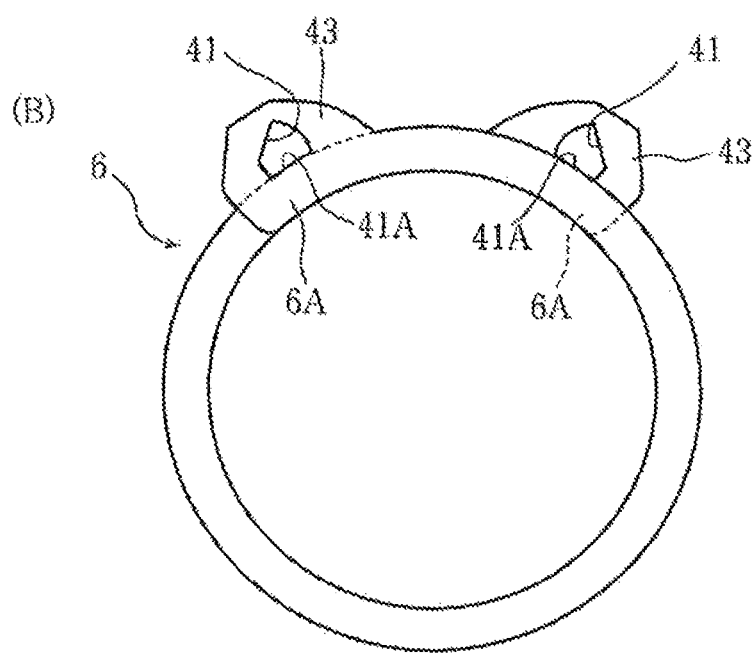
(B)

PIPE JOINT

FIELD OF THE INVENTION

This invention relates to a pipe joint.

BACKGROUND ART

The applicant of the present invention has proposed a pipe joint having a construction in which; in a pipe joint having a C-shaped fastening ring, the fastening ring is provided with a bolt member in a direction approximate to tangent line having a worm wheel portion on one end and a nut to be screwed to the bolt, the worm engaged to the worm wheel portion is driven by electric tools to rotate, and the fastening ring is diminished in diameter by screwing and fastening the nut and the bolt (refer to patent document 1, for example).

However, in the pipe joint described above, frictional resistance of rotation on the screwed portion is large because the fastening force on the bolt member and the nut member by screwing is extremely large, and frictional resistance on an engagement portion of the worm wheel and the worm is extremely large. Therefore, when used for a PEX pipe (bridged polyethylene pipe) of large diameter and thickness, fastening is difficult or impossible in some cases.

PRIOR ART DOCUMENT

Patent Document

Patent document 1: Japanese Patent Provisional Publication NO. 2009-168167.

OUTLINE OF THE INVENTION

Problems to be Solved by the Invention

Problems to be solved are; large loss in transmitting mechanism of rotational power from the electric tools to diminish the fastening ring in diameter, large rotational torque is required, and, the engagement portion of the worm and the worm wheel may be broken.

Means for Solving the Problems

Therefore, in the pipe joint related to the present invention, plural fastening rings vertically wound for a predetermined center angle of 360° to 480°, a guiding member holding the fastening rings as to restrict falling of the fastening rings and allow diminishing deformation, an approximately triangular toggle member disposed to protrude in a radial outer direction from the fastening rings in a pipe unconnected state, and a bolt-nut connection for moving a central peak portion of the toggle member in a radial inner direction as to reduce a height dimension of the toggle member, are provided; and a hitching-connecting means to make each of foot side end portions of the toggle member hitched or connected to each of end portions of the fastening ring is provided, and the end portions of the fastening ring is moved in a peripheral direction through the hitching-connecting means to diminish the fastening ring in diameter when the central peak portion of the toggle member is moved in the radial inner direction as to reduce the height dimension of the toggle member.

And, the hitching-connecting means is composed of a hitching claw portion protruding from each of the end portions of the fastening ring in the radial outer direction, and an edge of each of the foot side end portions of the toggle member.

Or, the hitching-connecting means is composed of a hole portion formed through each of the end portions of the fastening ring, and a small convex portion formed protruding from each of the foot side end portions of the toggle member and inserted to the hole portion as to loosely fit.

And, a cylindrical substitute member is mounted to a bolt rod composing the boll t-nut connection, the substitute member plastically deforms to keep a deformed configuration of the toggle member when the bolt-nut connection is fastened, and the bolt rod is parted when the bolt-nut connection is fastened to a final fastening position and reached for a predetermined fastening torque.

And, a bolt rod composing the bolt-nut connection has a hitching protrusion in the peripheral direction and a notch on a forth end side to the hitching protrusion, a base end portion of the bolt rod is continued to a ring portion having an inner diameter, larger than an outer diameter of a pipe to be connected, and held by the guiding member, a washer is disposed between a nut member composing the bolt-nut connection and the toggle member, the washer has a thin plate ring on a radial inner side, the thin plate ring has hitching claw piece portion on an inner peripheral side, the bolt rod breaks at the notch to part and the hitching claw piece portion hitches to the hitching protrusion to restrict movement of the thin plate ring in the radial outer direction as to keep a deformed configuration of the toggle member when the bolt-nut connection is fastened to a final fastening position and reached for a predetermined fastening torque.

And, a bolt rod composing the bolt-nut connection has a notch, a base end portion of the bolt rod is continued to a ring portion having an inner diameter, larger than an outer diameter of a pipe to be connected, and held by the guiding member, a cylindrical hitching member having a hitching claw portion on a peripheral face is mounted to the bolt rod and unified with the ring portion or the base end portion of the bolt rod, a washer is disposed between a nut member composing the bolt-nut connection and the toggle member, a hitched portion to which the hitching claw portion hitches is formed on an inner peripheral face of the washer, the bolt rod breaks at the notch to part and the hitching claw portion hitches to the hitched portion to restrict movement of the washer in the radial outer direction as to keep a deformed configuration of the toggle member when the bolt-nut connection is fastened to a final fastening position and reached for a predetermined fastening torque.

And, a fastening ring can be diminished in diameter, an approximately triangular toggle member disposed to protrude in a radial outer direction from the fastening ring in a pipe unconnected state, and a bolt-nut connection for moving a central peak portion of the toggle member in a radial inner direction as to reduce a height dimension of the toggle member, are provided; and the bolt rod composing the bolt-nut connection is parted by drawing or cutting breakage when the bolt-nut connection is fastened to a final fastening position and reached for a predetermined fastening torque as to reduce a protruding length of the bolt rod in radial direction.

Effects of the Invention

According to the present invention, force loaded by the electric tools or man power in radial direction is artfully (with high magnification) transformed to the fastening force (in peripheral direction) by the fastening ring, and the fastening ring can be strongly diminished in diameter with small torque. And, broken portions are eliminated. Further, when the pipe is the PEX pipe, etc, having large diameter and thickness, the fastening ring vertically wound can strongly bite into and fasten the pipe, and high sealing ability is shown by the strong press fitting to the inserted cylinder portion.

BRIEF DESCRIPTION OF THE DRAWINGS

FIG. 20 A top view showing the ring portion.

FIG. 21 Cross-sectional front views of principal portion in which (A) shows a state before the bolt rod is departed and (B) shows a state after the bolt rod is departed.

FIG. 22 Cross-sectional front views of principal portion showing another example of unification of a substitute member and the ring portion in which (A) shows a state before the bolt rod is departed and (B) shows a state after the bolt rod is departed.

FIG. 32 Views showing a cylindrical hitching member in which (A) shows a top view and (B) shows a cross-sectional front view.

FIG. 33 A cross-sectional front view showing a washer.

FIG. 38 Explanatory front views of the fastening ring used in the fourth embodiment in which (A) is a front view before diminishing and (B) is a front view of diminishing.

EMBODIMENTS OF THE INVENTION

Figure 1:
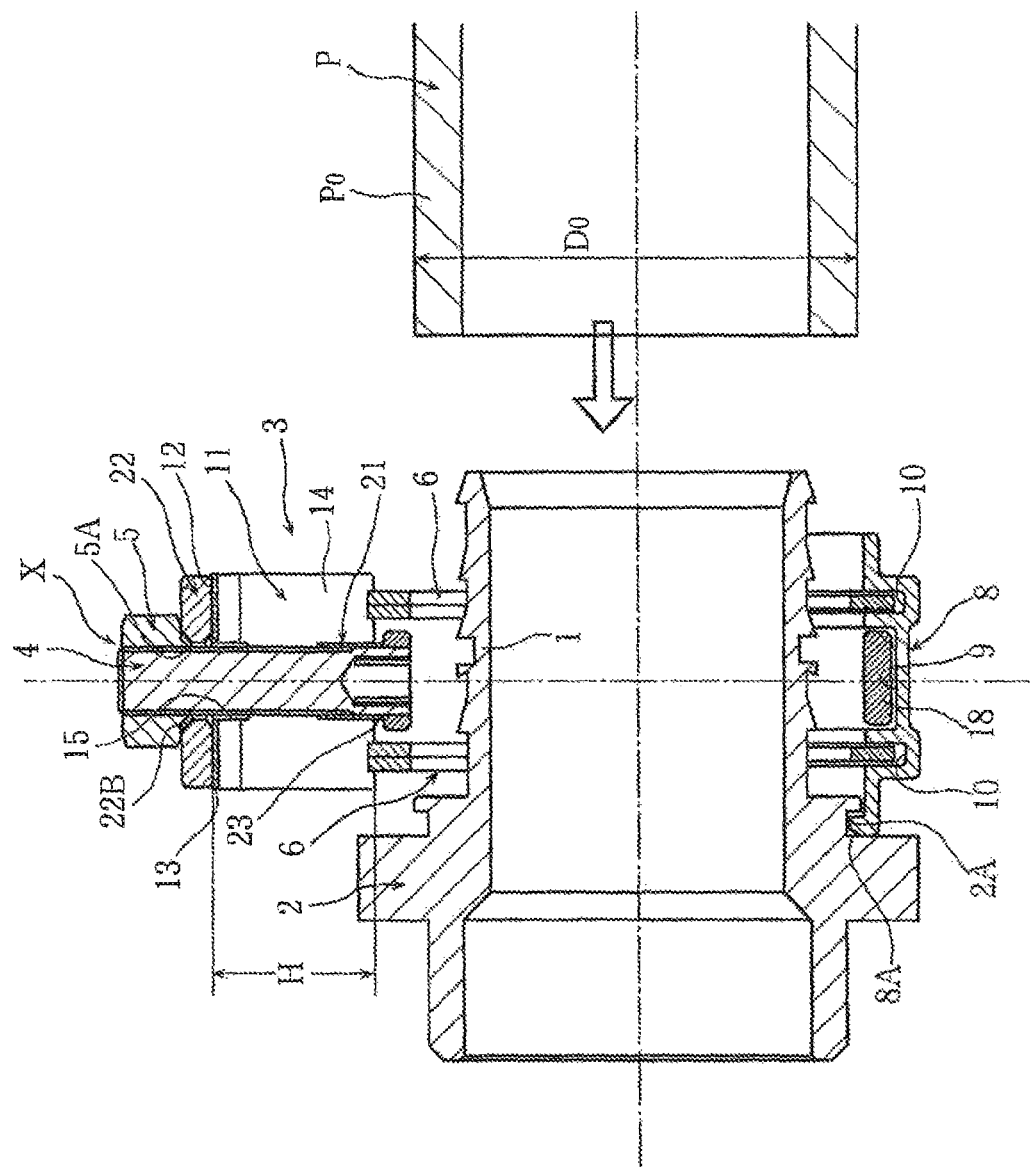
FIG. 1 A cross-sectional front view showing an unconnected state of a pipe to be connected of a first embodiment of the present invention.
Figure 2:
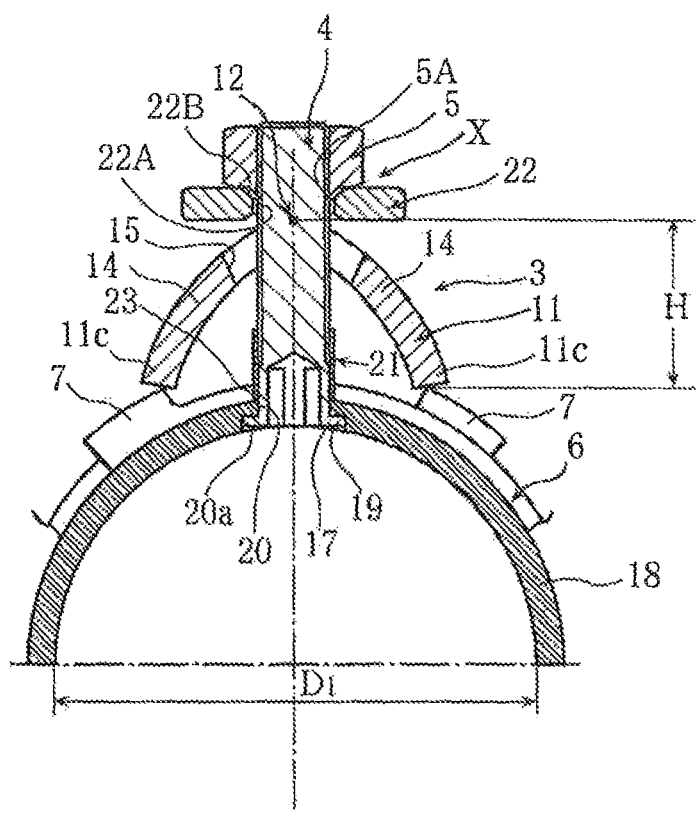
FIG. 2 A cross-sectional side view of a principal portion of FIG. 1.
Figure 3:
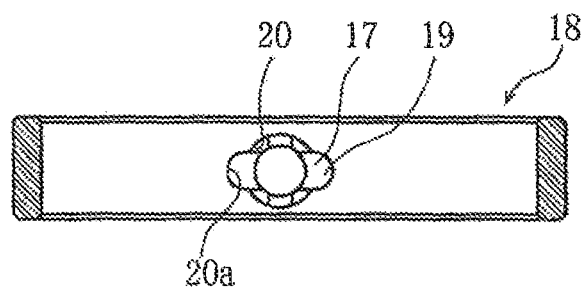
FIG. 3 An explanatory bottom view of a principal portion.
Figure 4:
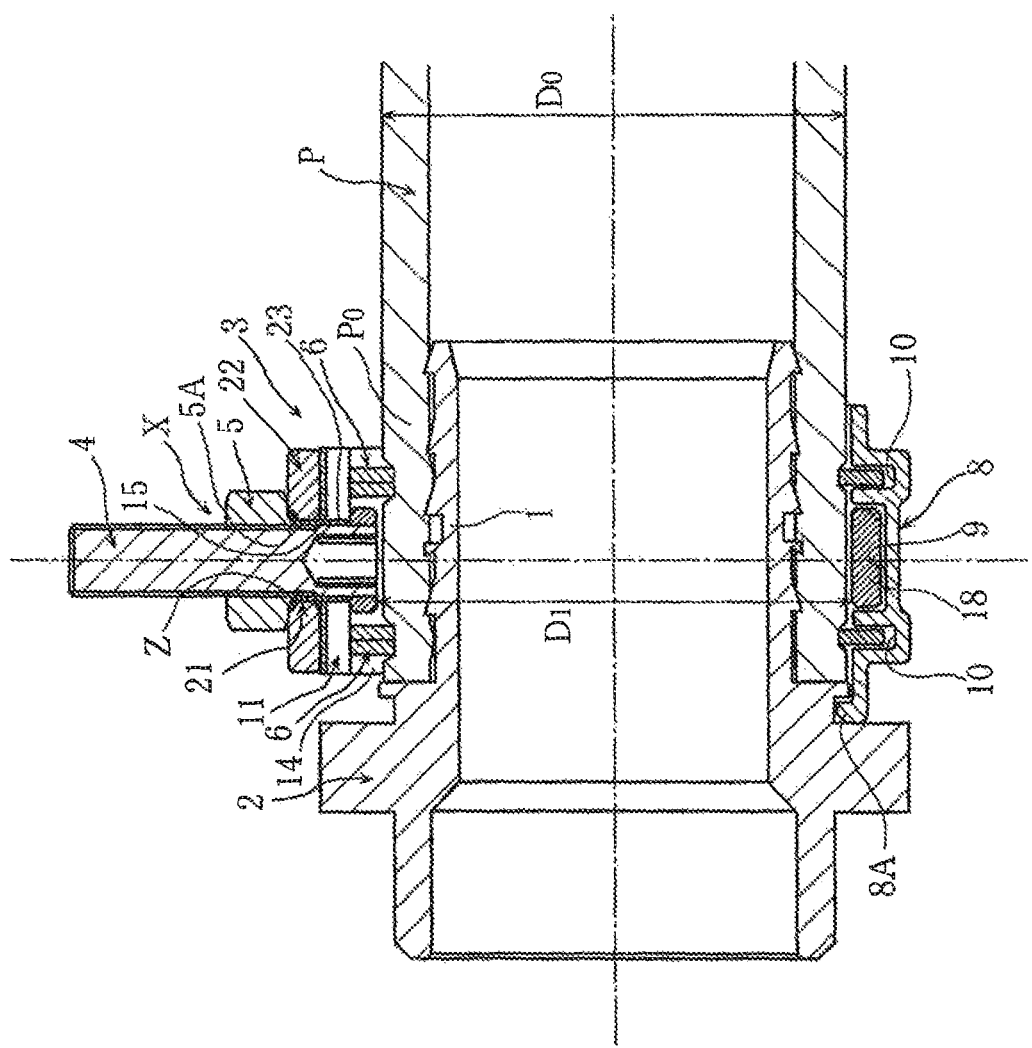
FIG. 4 A cross-sectional front view showing a state just before completing the connection of the pipe.
Figure 6:
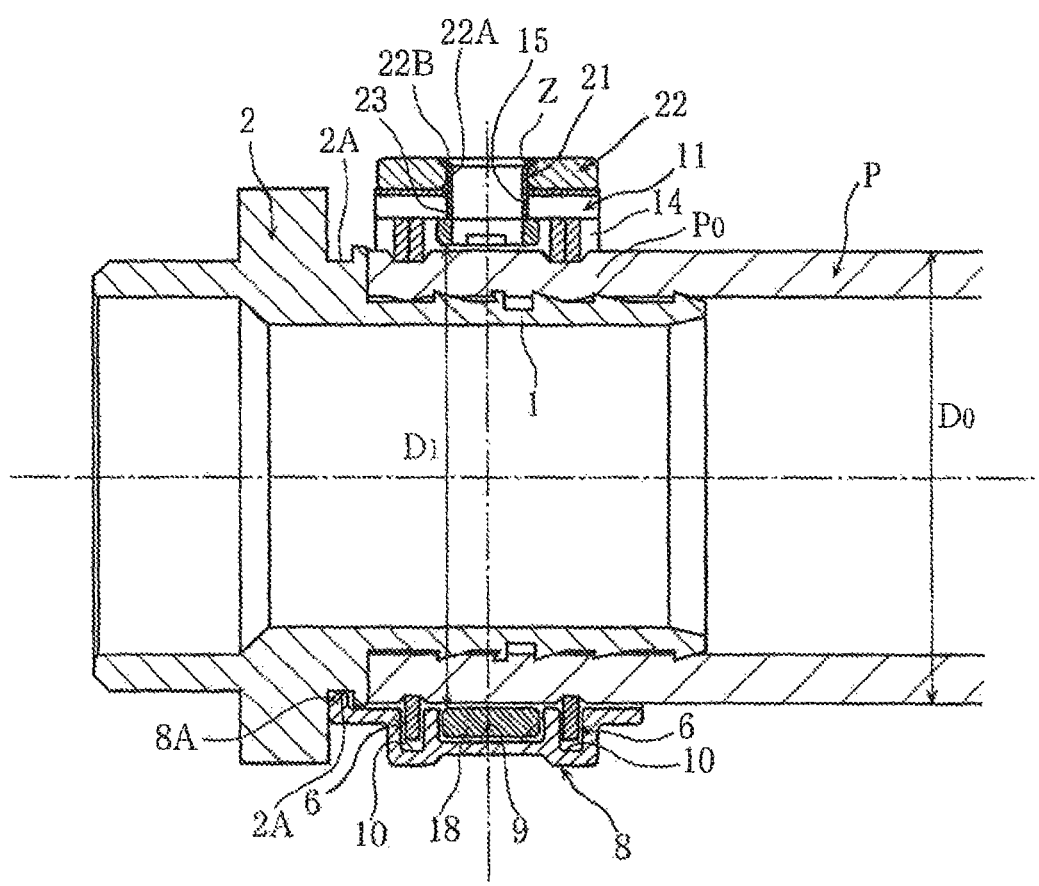
FIG. 6 A cross-sectional front view showing a state just before completing the connection of the pipe.
Figure 7:
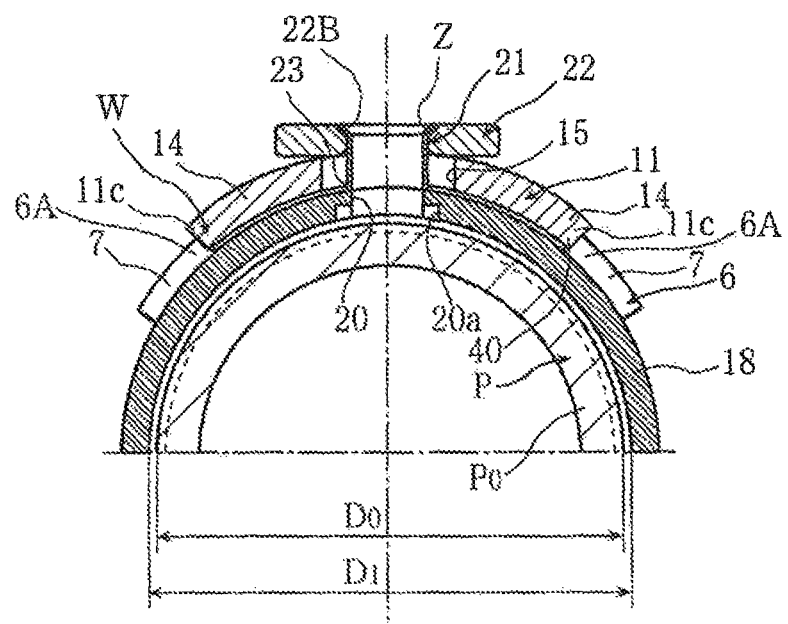
FIG. 7 A cross-sectional side view of a principal portion of FIG. 6.

FIGS. 1 through 22 show a first embodiment of the present invention. And, FIGS. 1 through 3 show an unconnected state of a pipe to be connected of the pipe joint. FIGS. 4 and 6 show a state just before the pipe connection is completed. FIGS. 6 and 7 show a completed state of the pipe connection. This pipe joint is composed of a joint main body 2 having an inserted cylinder portion 1 to be inserted to an end portion $P_0$ of a pipe P, and a fastening construction 3 to fasten the end portion $P_0$ of the pipe P from outside. And, when a bolt-nut connection X of the fastening construction 3 is fastened to a final fastening position and reached for a predetermined fastening torque $T_0$, a bolt rod 4 and a nut member 5 composing the bolt-nut connection X part from the joint, and fastened state of the pipe P is kept by the remaining portion of the fastening construction 3. Concretely, the bolt rod 4 is (as described later) parted by drawing out. And, various appliances not shown in Figures are connected to another end side opposite to the inserted cylinder portion 1 of the joint main body 2 to which the pipe P is connected. In the present invention, "axial direction" means a direction of axis of a ring portion 18 (described later), and "radial inner direction" and "radial outer direction" are used for a radial inner direction of the ring portion 18 and a radial outer direction of the ring portion 18 respectively.

Figure 9:
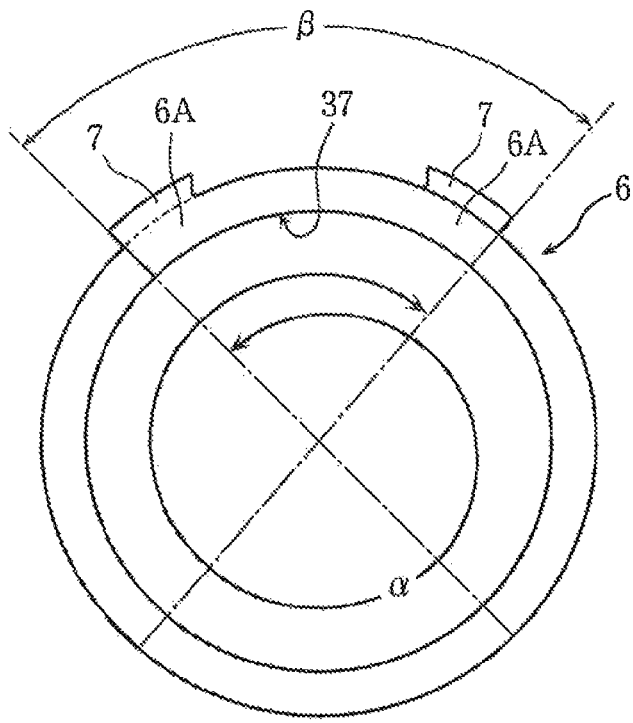
FIG. 9 A front view showing a fastening ring.
Figure 10:
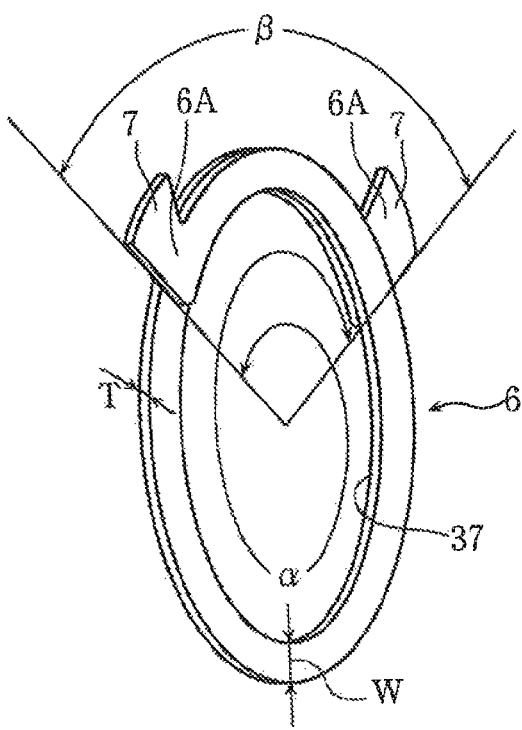
FIG. 10 A perspective view showing the fastening ring.
Figure 11:
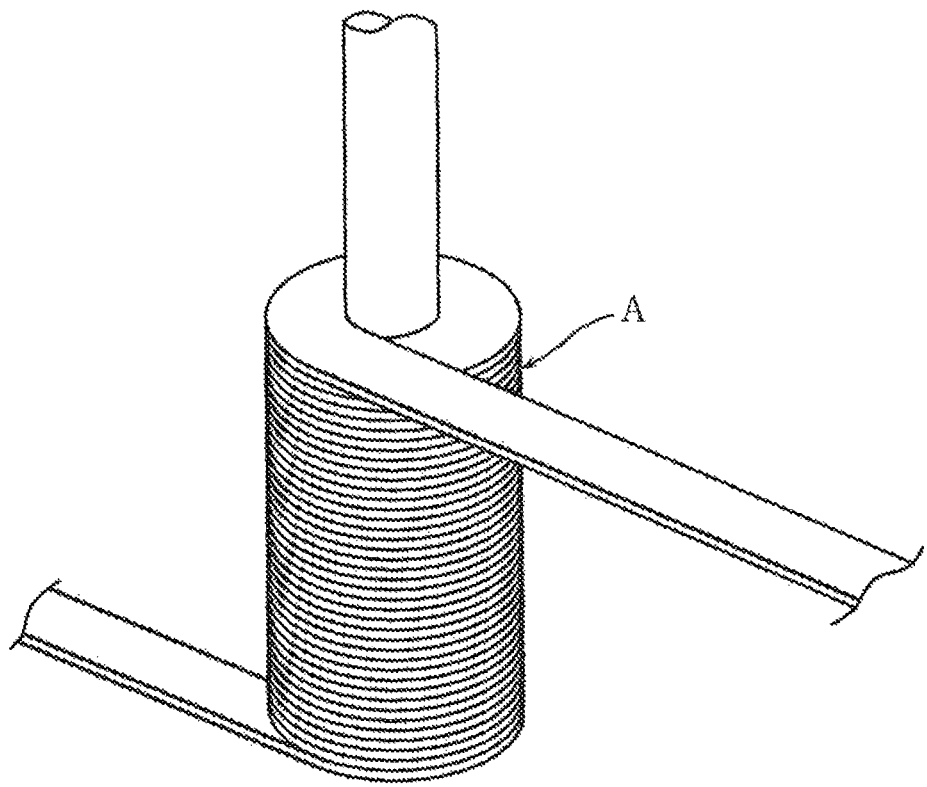
FIG. 11 An explanatory perspective view of production method and vertical winding of the fastening ring.

Concretely, the pipe joint has two fastening rings 6 vertically wound for a predetermined center angle α of 360° to 480°. For example, as shown in FIGS. 9 and 10, the pipe joint has the two fastening rings 6 vertically wound for the predetermined center angle α of 360° to 480°. The fastening ring 6 has a hitching claw portion 7 protruding in the radial outer direction. The fastening ring 6, for example, is made as that a vertical wound body A, vertically wound for many times as shown in FIG. 11, is cut into the center angle α of 360° to 480° by drawing work, etc, and punching out, the hitching claw portion 7, or a piece of plate (not shown in Figures) is punched and arc portions layered within a range of a center angle β of 30° to 120° are made by plastic work.

Figure 41:
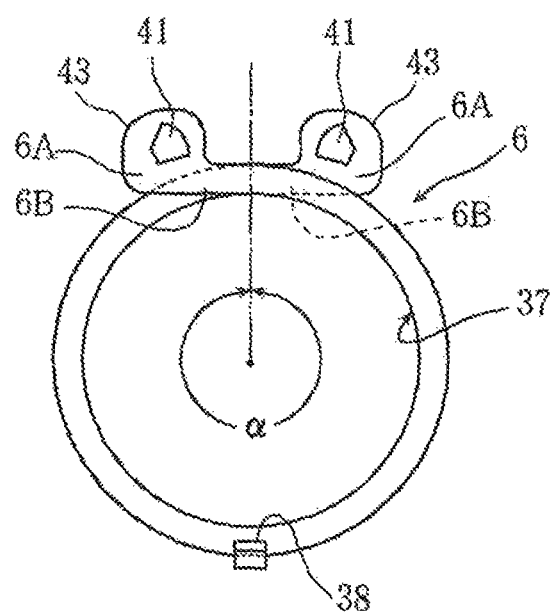
FIG. 41 A front view of the fastening ring.
Figure 42:
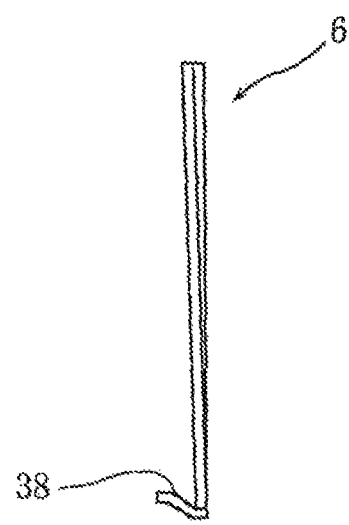
FIG. 42 A side view of the fastening ring.
Figure 43:
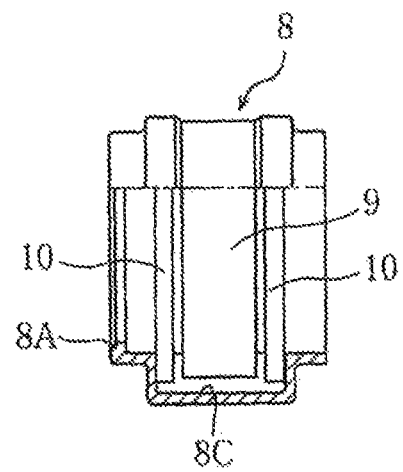
FIG. 43 A half cross-sectional view showing the guiding member used in FIG. 40.
Figure 48:
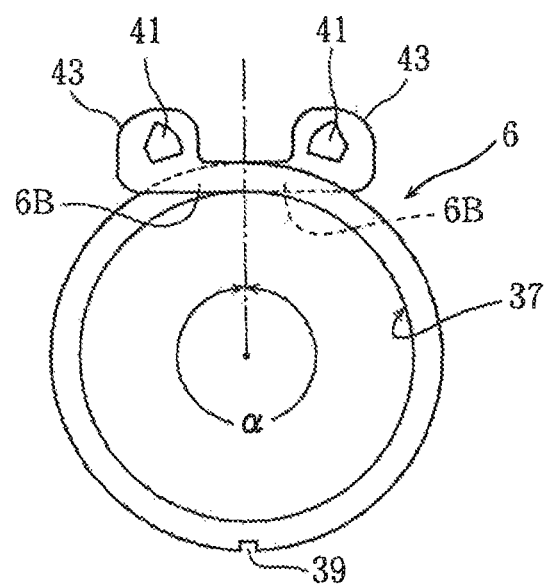
FIG. 48 A front view of the fastening ring.
Figure 49:
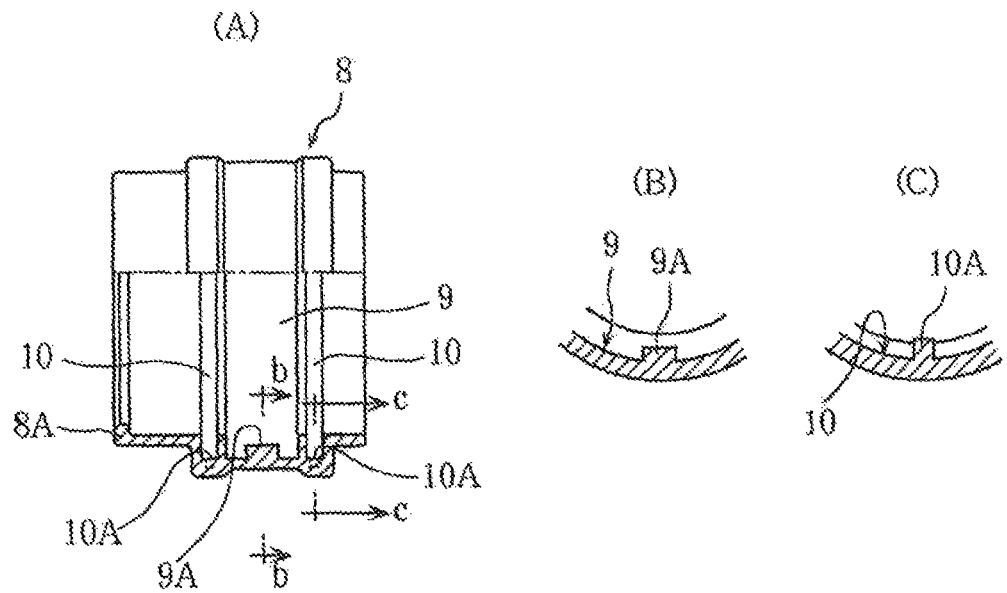
FIG. 49 Views showing the guiding member used in FIG. 47 in which (A) is a half cross-sectional view, (B) is a cross-sectional view on b-b line of (A), and (C) is a cross-sectional view on c-c line of (A).

And, as FIGS. 41 and 48 showing another embodiment described later, it is also preferable to make the center angle α to be 360° to 370° and provide straight portions 6B extending in a tangential direction to conduct fastening work smoothly.

The pipe joint has a guiding member 8 (refer to FIGS. 12 and 13) of plastic to hold the fastening ring 6 as to restrain the fastening ring 6 from falling and allow diminishing deformation in diameter. The guiding member 8 may be made of metal. The guiding member 8 has a wide groove 9 to hold the ring portion 18 (later described) and (narrow) deep grooves 10 to hold the fastening ring 6. The fastening ring 6 is can be certainly prevented from falling because the fastening ring 6 is held by the deep grooves 10. And, there is an advantage that the fastening ring 6 easily bites into the pipe P (the pipe P is easily deformed) because the cross-sectional face of the fastening ring 6 is narrow rectangular, and its longitudinal side is within a face at right angles with the axis (directed to the radial direction).

In the cross-sectional face of the fastening ring 6, a ratio of longitudinal length:lateral length of the narrow rectangular (vertical belt shape) is made 2.0 to 6.0 times, and more preferably, 2.5 to 4.0 times. That is to say, in FIG. 10, $2.0 \leq W/T \leq 6.0$, and more preferably, $2.5 \leq W/T \leq 4.0$. When the ratio is less than the minimum value, fastening pressure of the pipe does not become sufficiently large, and it is difficult to strongly fasten the pipe P (as shown in FIG. 6). On the contrary, when the ratio is over the maximum value, (although prevented from falling by the deep grooves 10 of the guiding member 8) the fastening ring 6 may fall in a direction which inclines from the face at right angles with the axis.

And, the pipe joint has an approximately triangular toggle member 11 disposed protruding in the radial outer direction outward from the fastening ring 6 in a pipe unconnected state. The toggle member 11 in an approximately L-shaped shown in FIGS. 2 and 14 deforms into an arc shape shown in FIGS. 5 and 7 to work as a "strutting member" to strut between the hitching claw portions 7 to diminish the fastening ring 6 in diameter. As described above, the toggle member 11 can be called "strutting member", "toggle-shaped strutting piece", or "interval increasing member between the hitching claw portions".

A part of the toggle member 11 corresponding to a central peak portion 12 is formed as one unit having a thin portion 13 plastically deformable. An arc piece portion 14 is continued respectively from the left side and the right side of the central peak portion 12 when observed in the axial direction.

Figure 14:
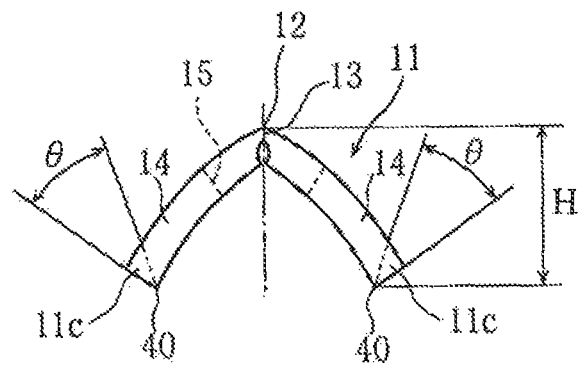
FIG. 14 A front view showing a toggle member.
Figure 15:
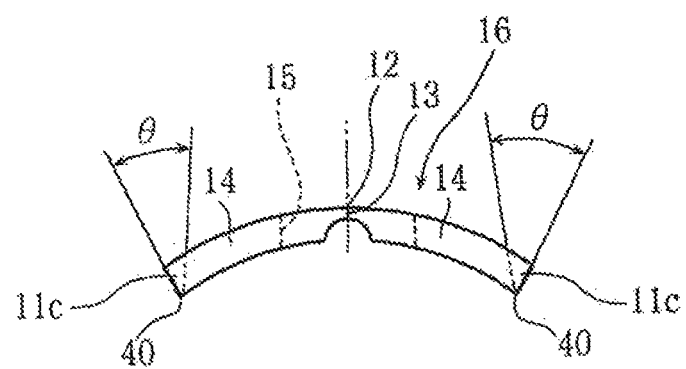
FIG. 15 A front view showing production method of the toggle member.
Figure 16:
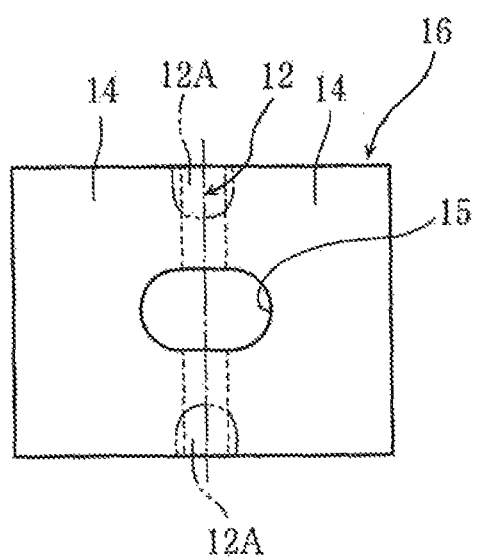
FIG. 16 A top view showing production method of the toggle member.
Figure 17:
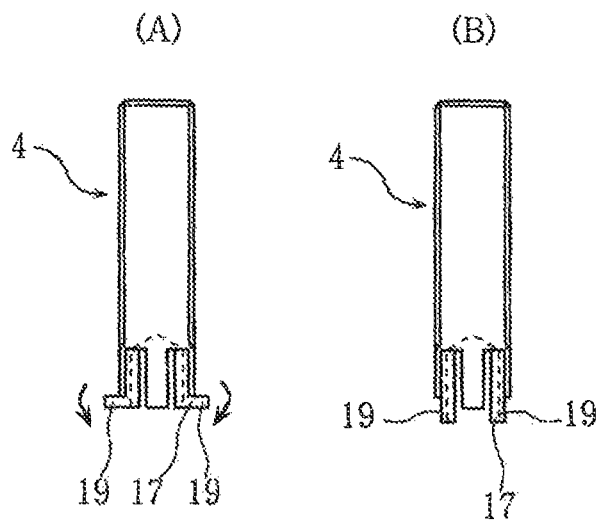
FIG. 17 Front views showing a bolt rod in which (A) shows a state before the bolt rod is departed and (B) shows a state after the bolt rod is departed.
Figure 18:
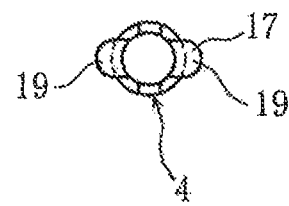
FIG. 18 A bottom view of FIG. 17(A).
Figure 19:
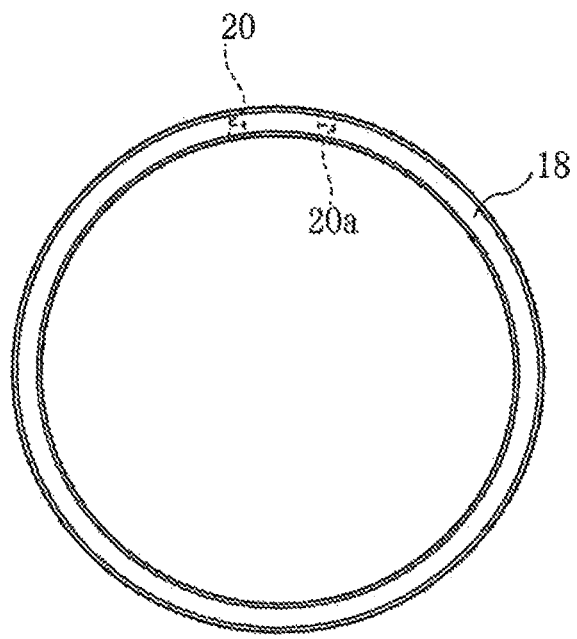
FIG. 19 A front view showing a ring portion.

A mark 15 shows a hole portion (of ellipse) to which the bolt rod 4 is inserted. The toggle member 11 can be made with an arc plate piece 16 as shown in FIGS. 15 and 16 by plastic deformation as shown in FIG. 14.

A bolt-nut connection X (refer to FIGS. 1, 2, 4, and 5), which moves the central peak portion 12 of the toggle member 11 in the radial inner direction as to reduce the height dimension H of the toggle member 11, is provided. When the central peak portion 12 of the toggle member 11 is moved in the radial inner direction, foot side end portions (forth end portions) 11C hitching to the hitching claw portions 7 and moving in the peripheral direction to diminish the fastening ring 6 in diameter.

In other words, the pipe joint relating to the present invention is provided with a hitching-connecting means W to make each of the foot side end portions 11C hitching or connected to each of the end portions 6A of the fastening ring 6. In the first embodiment shown in FIGS. 1 through 22, and in second and third embodiments (FIGS. 23 through 33) described later, the hitching-connecting means W is composed of the hitching claw portions 7 protruding from the end portions 6A of the fastening ring 6 in the radial outer direction and edges 40 of the foot side end portions 11C of the toggle member 11. And, when the central peak portion 12 of the toggle member 11 is moved in the radial inner direction as to reduce the height dimension H of the toggle member 11, the end portions 6A of the fastening ring 6 are moved in the peripheral direction (direction to part) through the hitching-connecting means W to diminish the fastening ring 6.

Figure 5:
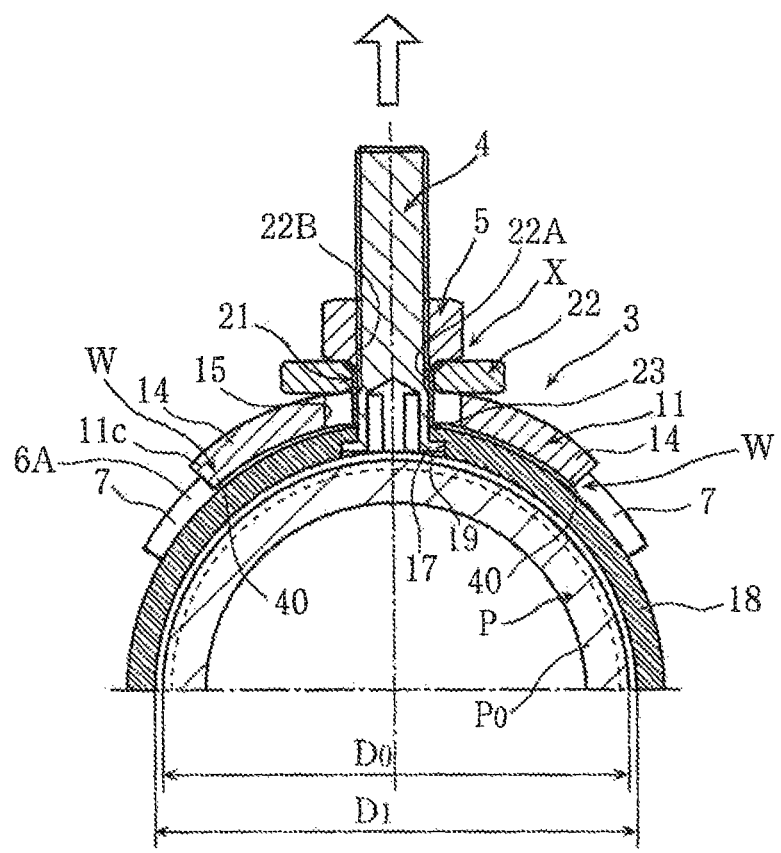
FIG. 5 A cross-sectional side view of a principal portion of FIG. 4.
Figure 8:
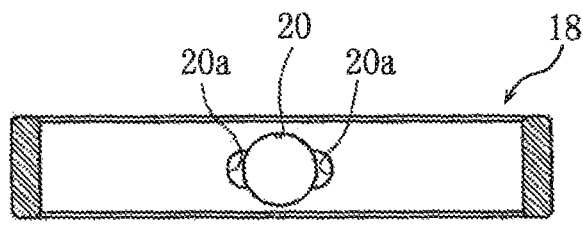
FIG. 8 An explanatory bottom view of a principal portion.

As shown in FIGS. 2, 5, and 21, a base end portion 17 of the bolt rod 4 (refer to FIGS. 17 and 18), composing the bolt-nut connection X, has an inner diameter $D_1$ larger than an outer diameter $D_0$ of the pipe P to be connected, and the base end portion 17 is hitching (fixed) to the ring portion 18 (refer to FIGS. 19 and 20) held by the guiding member 8. Concretely, two hitching protruding pieces 19 are formed protruding radially outward on the base end portion 17 of the bolt rod 4, and hitching to a hitching hole portion 20 formed on the ring portion 18 with rotation stop. That is to say, as shown in FIG. 8, the hitching hole portion 20 has two hitched concave portions 20a having configurations corresponding to the hitching protruding pieces 19. The ring portion 18 is fixed (connected) to the bolt rod 4 with hitching as an independent member in the first embodiment.

As shown in FIGS. 1, 2, 4 through 7, and 21, a substitute member 21 is mounted to the bolt rod 4. When the bolt-nut connection X is fastened, the substitute member 21 is plastically deformed to keep the deformed configuration of the toggle member 11, and the bolt rod 4 parted when the bolt-nut connection X is fastened to the final fastening position and reached for a predetermined fastening torque $T_0$. FIG. 17(A) shows a state in which the bolt rod 4 is hitching to the ring portion 18, and FIG. 17(B) shows a state in which the bolt rod 4 is parted from the ring portion 18. That is to say, the hitching protruding pieces 19 are plastically deformed as shown with arrows in FIG. 17(A) when the bolt rod 4 is parted from the ring portion 18. A washer 22 is disposed between the nut member 5 composing the bolt-nut connection X and the toggle member 11, and, the washer 22 shows a function to rotate the nut member 5 smoothly (lightly) against the toggle member 11 and a function to prevent the nut member 5 from biting into an inner peripheral end edge of an elliptic hole portion 15 (shown in FIG. 16).

As shown in FIG. 21, a lower end 23 of the substitute member 21 is welded to the ring portion 18. FIG. 22 shows a modification in which the lower end 23 of the substitute member 21 is stopped by hitching to the concave portion 20a of the hitching hole portion 20. And, although not shown in Figures, it is also preferable to fix the substitute member 21 to the ring portion 18 by other fixation means such as brazing, caulking, etc.

To express the characteristics of the present invention in another point of view, the following can be said. That is to say, the fastening ring 6 which can be diminished in diameter, the approximately triangular toggle member 11 disposed to protrude in the radial outer direction from the fastening ring 6 in the pipe unconnected state, and the bolt-nut connection X for moving the central peak portion 12 of the toggle member 11 in the radial inner direction as to reduce the height dimension H of the toggle member 11, are provided; and the bolt rod 4 composing the bolt-nut connection X is parted by drawing when the bolt-nut connection X is fastened to the final fastening position and reached for the predetermined fastening torque $T_0$ as to reduce the protruding length of the bolt rod 4 in radial direction.

To make additional explanation in FIGS. 1 through 22 hereby, "rotation stop" and "drawing stop" of the bolt rod 4 are made by mutual hitching of the hitched concave portions 20a of the ring portion 18 and the hitching protruding pieces 19 of the bolt rod 4.

And, as shown in FIGS. 1, 4, 6, 12, 13, etc., a peripheral concave groove 2A is formed on the joint main body 2 on an inner position (on the left side of the Figures) to the base end of the inserted cylinder portion, a hitching protrusion 8A is formed on the guiding member 8, and the fastening construction 3 and the pipe P after the connection is completed are stopped as not to move from the joint main body 2 in the axial direction by hitching the hitching protrusion 8A to the peripheral concave groove 2A.

And, two fastening rings 6 are disposed, the foot side end portions 11C of the toggle member 11 can be moved by the bolt-nut connection X in the radial inner direction with stable posture (without inclination). And, four fastening rings 6 may be used.

Figure 12:
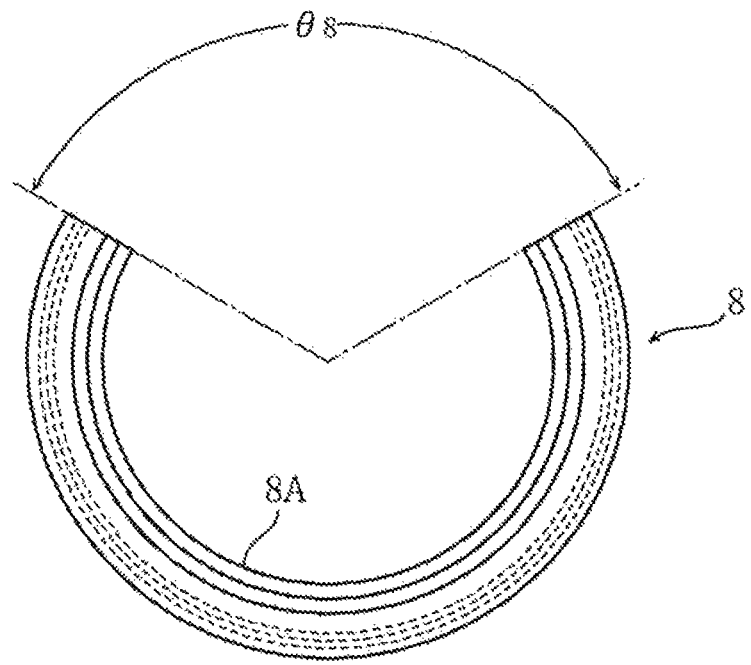
FIG. 12 A front view showing a guiding member.
Figure 13:
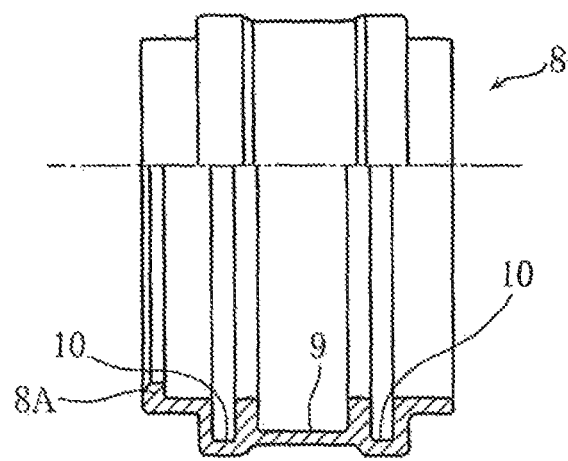
FIG. 13 A half cross-sectional side view showing the guiding member.

And, in FIG. 12, a notched central angle $\theta_8$ is 90° to 170°. More preferably, 110° to 140°.

To deform the substitute member 21 in FIGS. 1 and 2 plastically as shown in FIGS. 4 and 5 (FIGS. 6 and 7) to keep the toggle member 11 within a small height dimension, a hole 22A having an inner diameter dimension slightly larger than the outer diameter dimension of the substitute member 21 is formed through the washer 22, a rather large chamfer 22B is formed (on the nut member 5 side), and, a triangular protrusion 5A for diameter expansion is formed on an opening end portion of tapped hole on the nut member 5 as to plastically deform an outward end portion of the cylindrical substitute member 21 into a small bell shape Z.

The arc piece portions 14 of the toggle member 11 shown in FIGS. 14 and 15 may be straight piece portions (not shown in Figures). And, other than the case that the edge 40 on (the inner peripheral face side of) the foot side end portion 11C is a right angle edge as shown with solid lines in FIGS. 14 and 15, the end portion 11C may be notched with a predetermined acute angle $\theta$ as shown with broken lines in FIGS. 14 and 15 to make the edge 40 with acute angle to easily hitches to the hitching claw portion 7.

Figure 25:
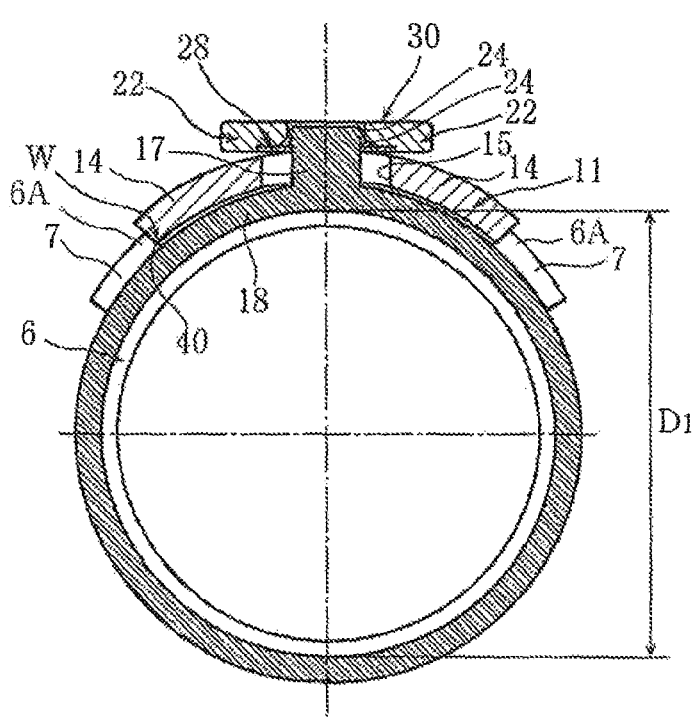
FIG. 25 A simplified cross-sectional front view showing a completed state of the connection of the pipe.
Figure 26:
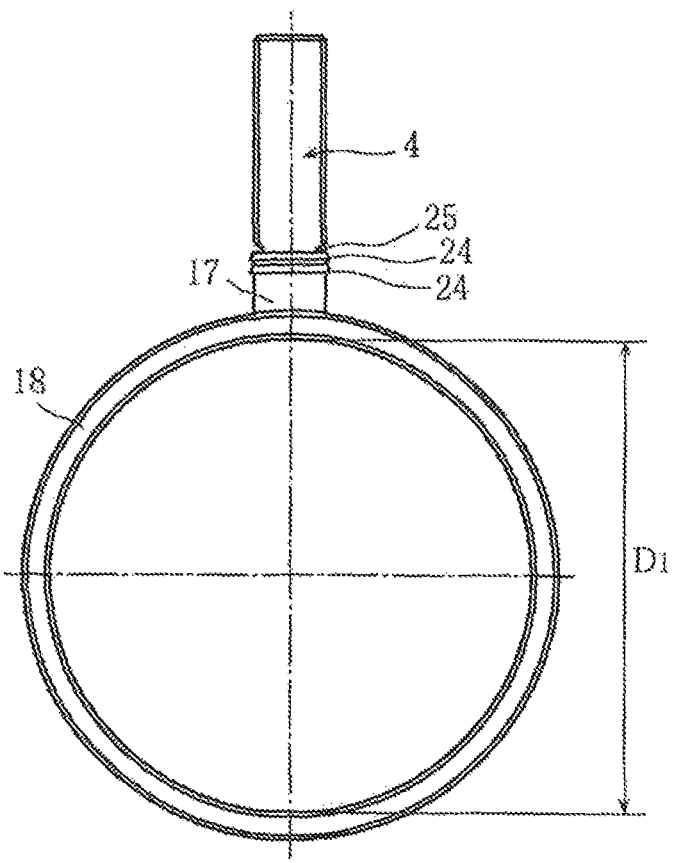
FIG. 26 A front view showing the unified bolt rod and ring portion.
Figure 27:
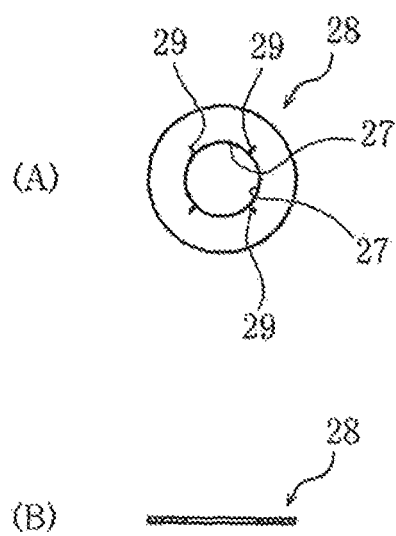
FIG. 27 Views showing a thin plate ring in which (A) shows a top view and (B) shows a cross-sectional front view.
Figure 28:
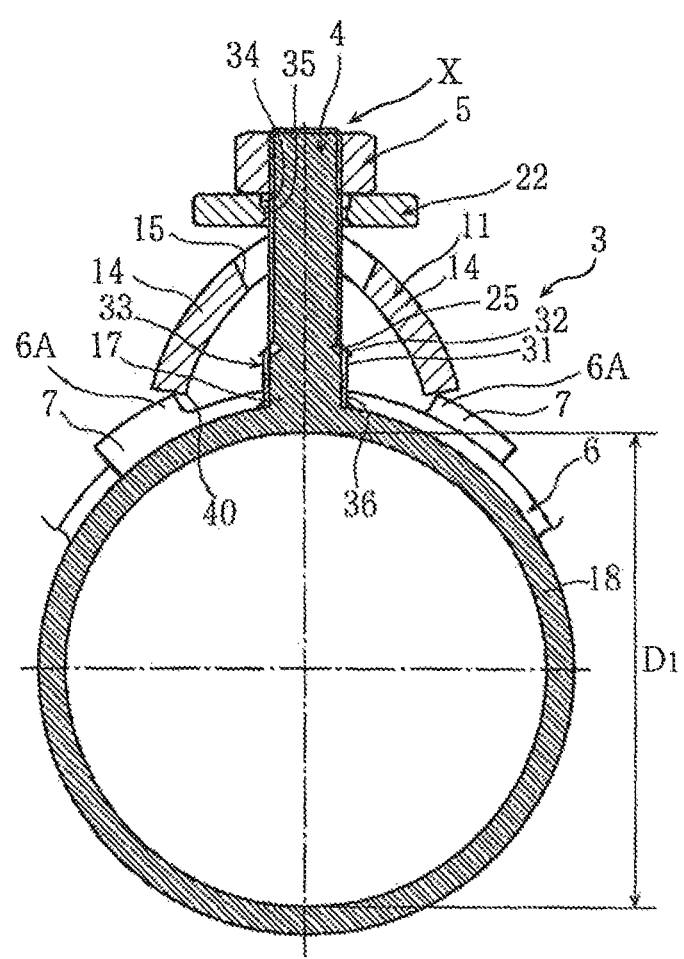
FIG. 28 A simplified cross-sectional front view showing an unconnected state of a pipe to be connected of a third embodiment of the present invention.
Figure 29:
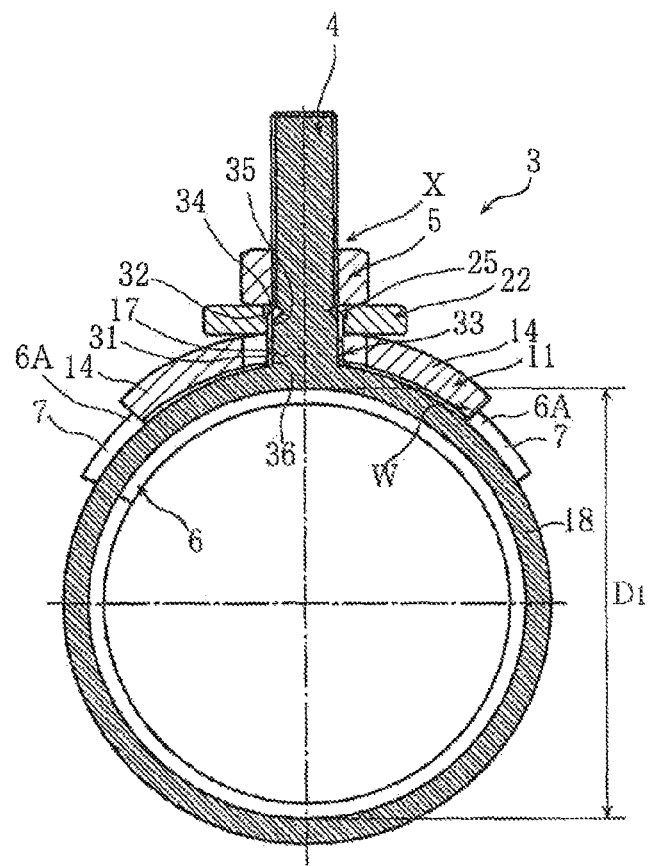
FIG. 29 A simplified cross-sectional front view showing a state just before completing the connection of the pipe.
Figure 30:
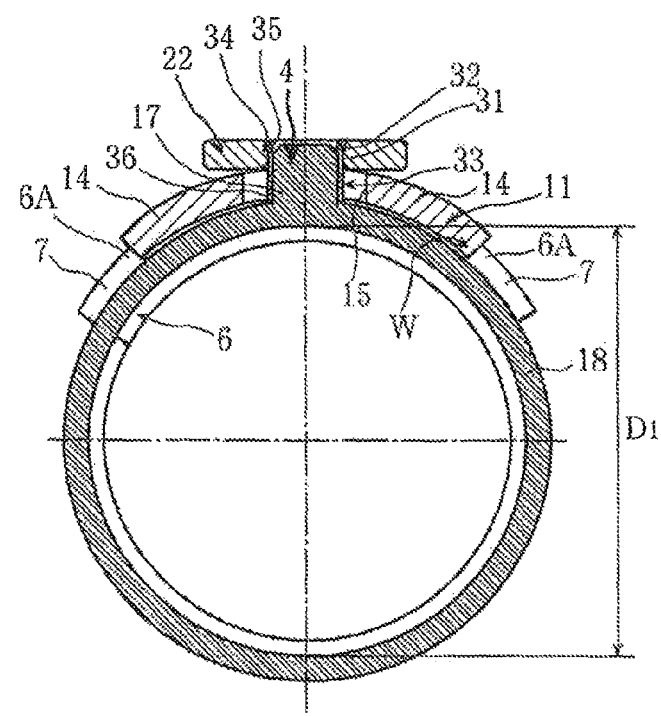
FIG. 30 A simplified cross-sectional front view showing a completed state of the connection of the pipe.
Figure 31:
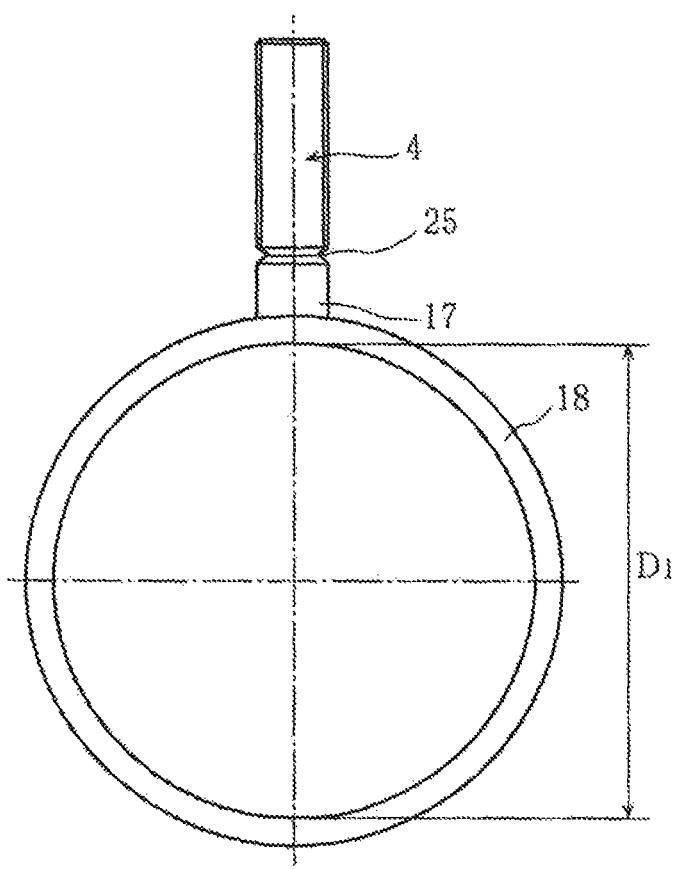
FIG. 31 A front view showing the unified bolt rod and ring portion.

FIGS. 23 through 27 show a second embodiment. The base end portion 17 of the bolt rod 4 is continued to the ring portion 18 (held by the guiding member 8) having the inner diameter $D_1$, larger than the outer diameter $D_0$ of the pipe P to be connected (refer to FIGS. 1, 4, and 6). The bolt rod 4 has two hitching protrusions 24 in the peripheral direction on the base end portion 17 side and a notch (cutting) 25 on a forth end side to the hitching protrusions 24. The washer 22 has a hitching claw piece portion 27 in the inner peripheral side. Concretely, the washer 22 has a thin plate ring (return-stopping member) 28 as shown in FIG. 27 on a radial inner side, and the thin plate ring 28 has the hitching claw piece portion 27. A mark 29 shows a notch. A washer main body 30 and the thin plate ring 28 are fixed by caulking, spot welding, etc.

The bolt rod 4 cuts (breaks) at the notch 25 to part and the hitching claw piece portion 27 hitches to the hitching protrusion 24 to restrict movement of the washer 22 in the radial outer direction as to keep the strutting deformed configuration of the toggle member 11 when the bolt-nut connection X is fastened to the final fastening position and reached for the predetermined fastening torque $T_0$. The plural hitching protrusions 24 can absorb tolerance of the pipe P. Other constructions are similar to that of the first embodiment. Especially, the hitching means W is similar to that of the first embodiment in the point that the hitching means W is composed of the hitching claw portion. 7 and the edge 40 (mutually hitching).

Figure 23:
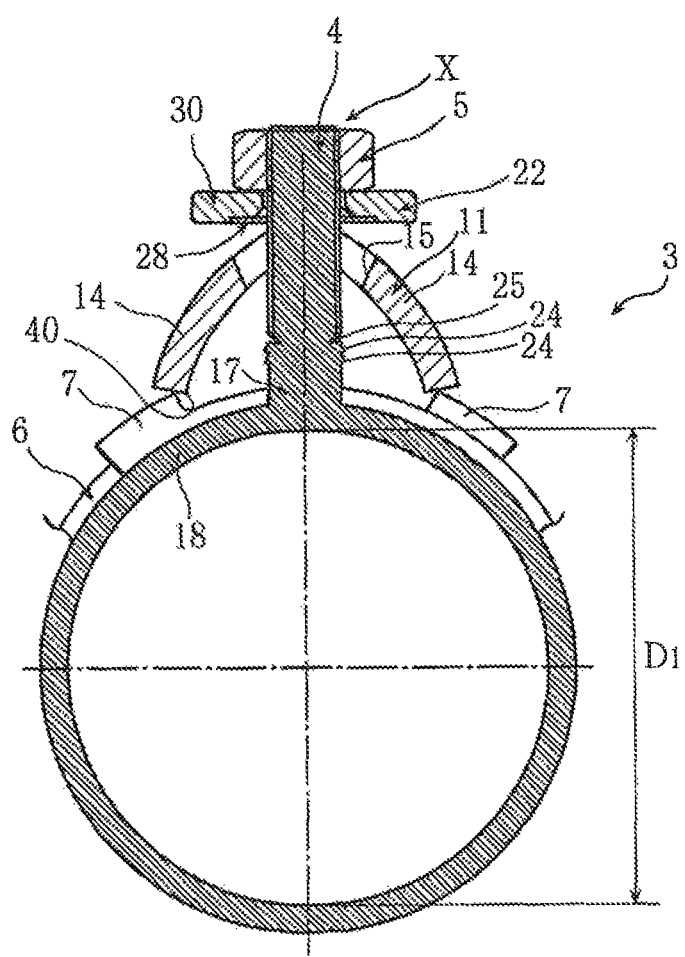
FIG. 23 A simplified cross-sectional front view showing an unconnected state of a pipe to be connected of a second embodiment of the present invention.
Figure 24:
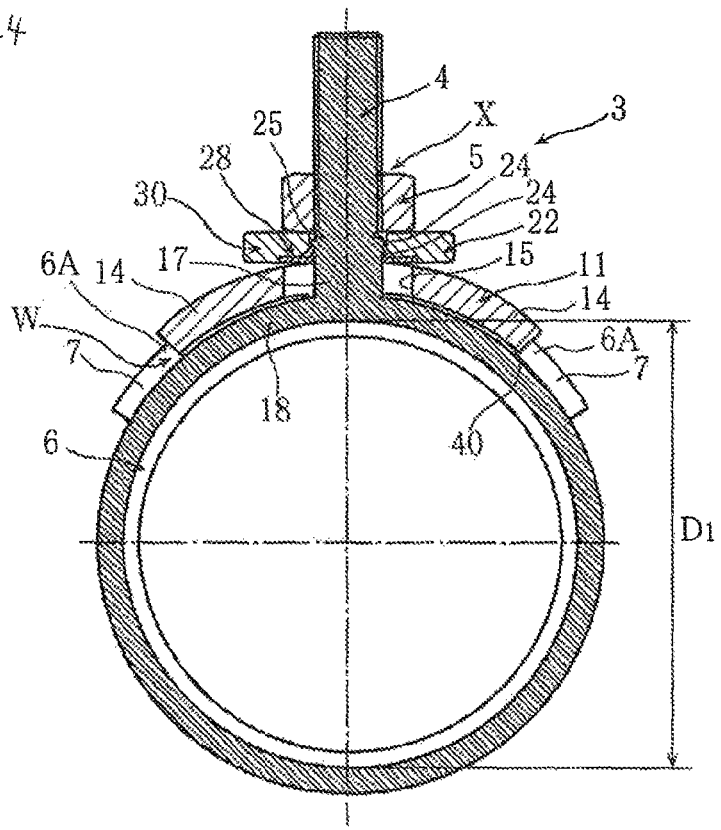
FIG. 24 A simplified cross-sectional front view showing a state just before completing the connection of the pipe.
Figure 51:
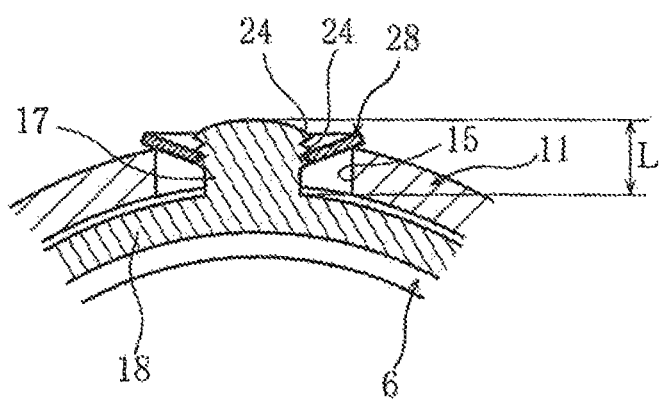
FIG. 51 A simplified cross-sectional front view showing a state of completed pipe connection of a modification of the second embodiment.

FIG. 51 shows a modification of the second embodiment (corresponding to FIG. 25). The washer main body 30 and the thin plate ring 28 are separated (namely, not fixed). The notch 25 is disposed on the radial inner side in comparison with FIGS. 23, 24, and 26 showing the pipe joint of the second embodiment. And, the cutting position of the bolt rod 4 is on the radial inner side in comparison with the second embodiment. There is an advantage that a protruding length dimension L is short. The bolt rod 4 cuts (breaks) at the notch 25 to part, and the nut member 5 and the washer main body 30 are parted when the bolt-nut connection X is fastened to the final fastening position and reached for the predetermined fastening torque $T_0$. In the completed state of pipe connection, the toggle member 11 is sufficiently pressed by the thin plate ring 28 to prevent the toggle member 11 from returning to the original configuration because the force in the radial outer direction working on the toggle member 11 is small. Other constructions are similar to that of the second embodiment.

FIGS. 28 through 33 show a third embodiment. The bolt rod 4 has the notch 25 (on the base end portion 17), a cylindrical hitching member 33, having a hitching claw portion 32 on a peripheral face 31, is mounted to the bolt rod 4, and a base end 36 of the cylindrical hitching member 33 is united with the ring portion 18 or the base end portion 17 of the bolt rod 4 by brazing, caulking, adhesion, welding, etc. A hitched portion 35, to which the hitching claw portion 32 hitches, is formed on an inner peripheral face 34 of the washer 22. The bolt rod 4 cuts at the notch 25 to part and the hitching claw portion 32 hitches to the hitched portion 35 to restrict movement of the washer 22 in the radial outer direction as to keep the deformed configuration of the toggle member 11 when the bolt-nut connection X is fastened to the final fastening position and reached for the predetermined fastening torque $T_0$. Other constructions are similar to that of the second embodiment. Especially, the hitching-connecting means W is similar to that of the first and second embodiments.

The guiding member 8 is not shown in FIGS. 2, 5, 7, 23, 24, 25, 28, 29, 30, etc. And, the pipe P is not shown in FIGS. 24, 25, 29, and 30.

In the present invention, being modifiable, the number of the hitching protrusion 24 may be 1, 3, or more than 3 in the second embodiment. And, to express the characteristics of a modification of the second and third embodiments in another point of view, the following can be said. That is to say, the fastening ring 6 which can be diminished in diameter, the approximately triangular toggle member 11 disposed to protrude in the radial outer direction from the fastening ring 6 in the pipe unconnected state, and the bolt-nut connection X for moving the central peak portion 12 of the toggle member 11 in the radial inner direction as to reduce the height dimension H of the toggle member 11, are provided; and the bolt rod 4 composing the bolt-nut connection X is parted by cutting breakage when the bolt-nut connection X is fastened to the final fastening position and reached for the predetermined fastening torque $T_0$ as to reduce the protruding length of the bolt rod 4 in radial direction.

Figure 34:
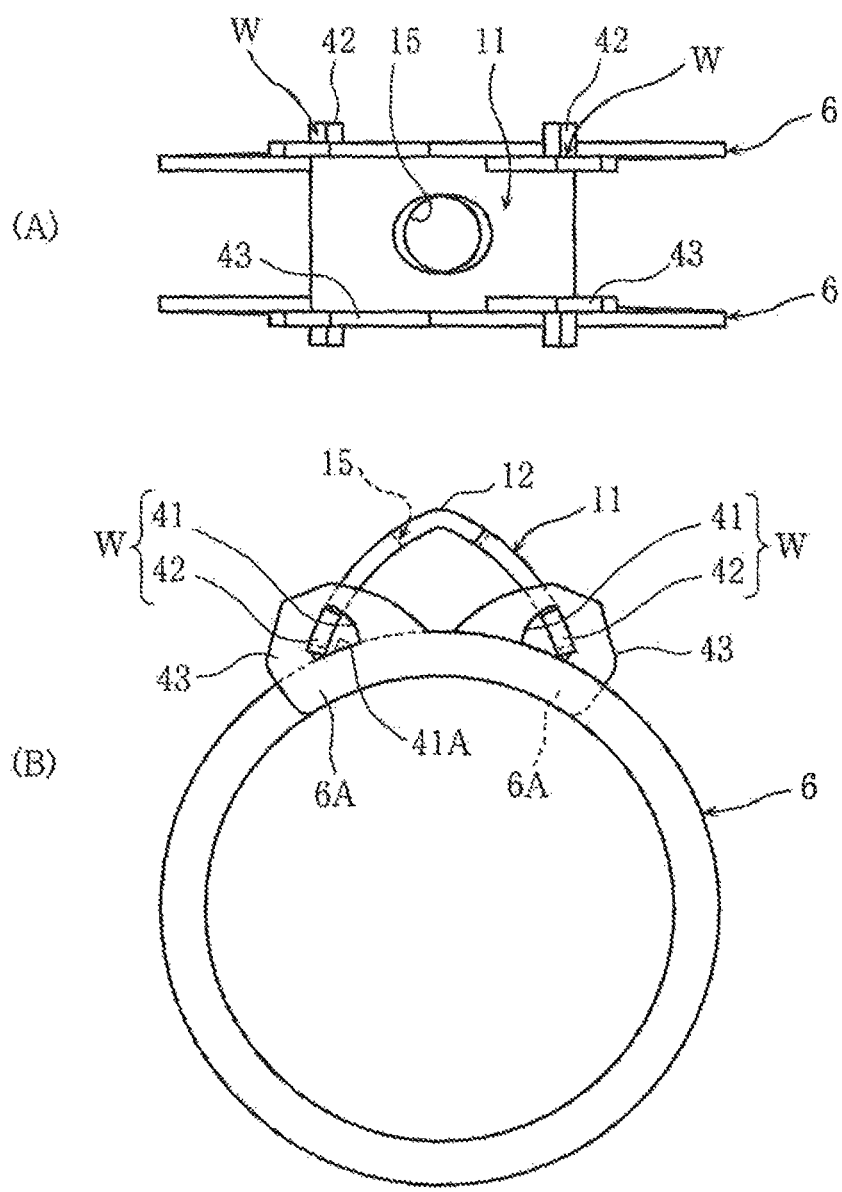
FIG. 34 Views of a unit (before diminishing in diameter), in which plural principal parts are connected, showing a principal construction of a fourth embodiment in which (A) is a top view and (B) is a front view.
Figure 35:
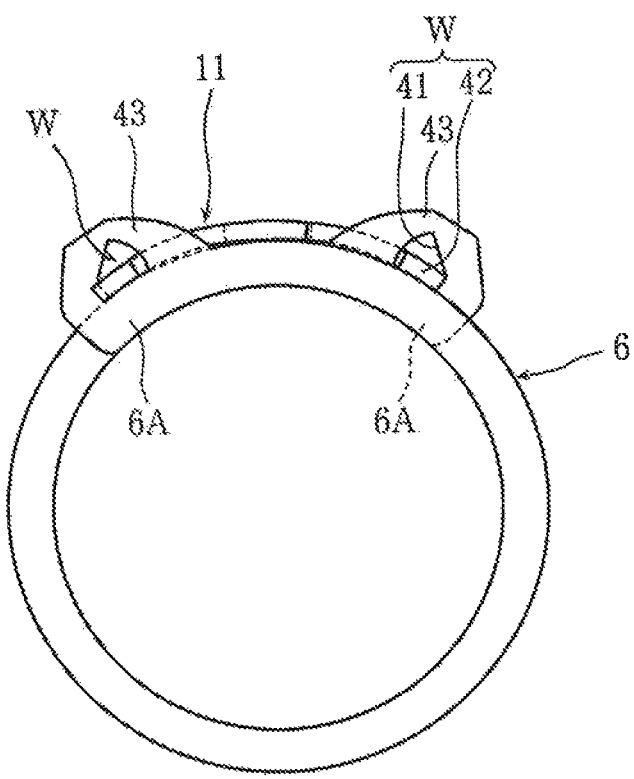
FIG. 35 A front view of the unit showing a state after diminishing in the fourth embodiment.
Figure 36:
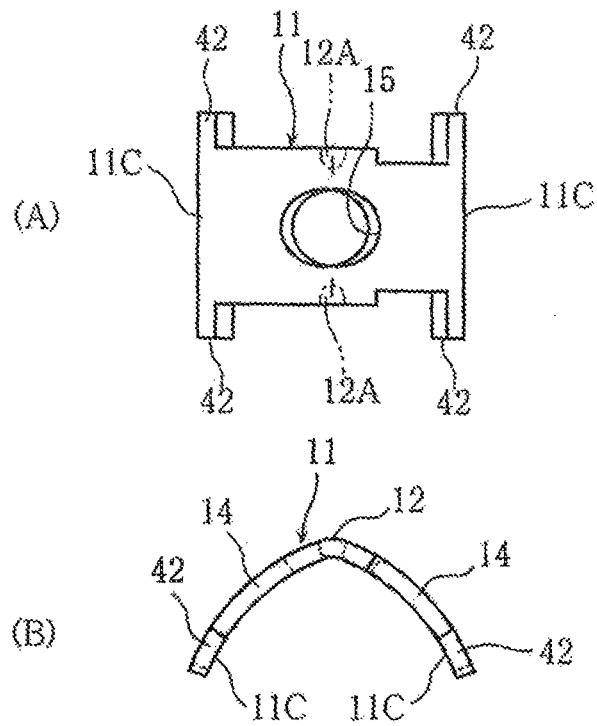
FIG. 36 Views of the toggle member in the state shown in FIG. 34 in which (A) is a top view and (B) is a front view.
Figure 37:
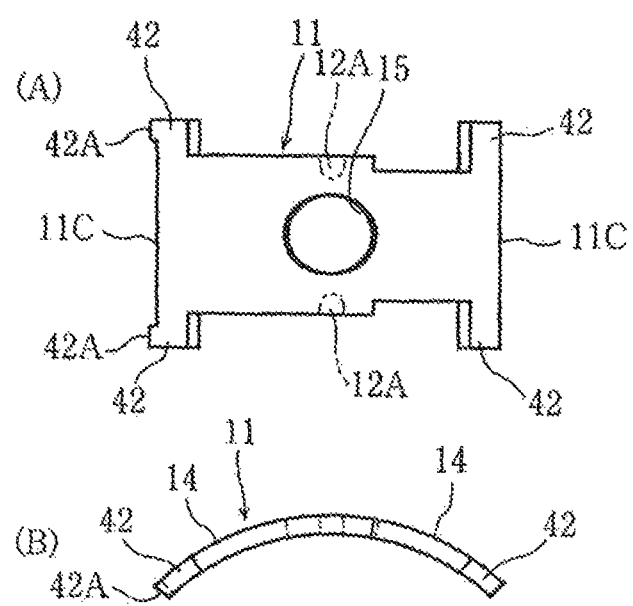
FIG. 37 Views of the toggle member in the state shown in FIG. 35 in which (A) is a top view and W is a front view.

Next, FIGS. 34 through 38 show a fourth embodiment of the present invention in which FIGS. 34 and 35 show only principal constructions extracted, and FIGS. 36 through 38 show only principal (important) parts. In FIGS. 34 through 38, the fastening ring 6 and the toggle member 11 are preliminarily made as a unit before the assembled state (used state) shown in FIGS. 1, 2, 23, and 28. That to say, the hitching-connecting means W is defined as to include the case that each of the foot side end portions 11C of the toggle member 11 is connected (fit) to each of the end portions 6A of the fastening ring 6.

To explain concretely based on FIGS. 34 through 38, a protruding piece portion 43 is continued from (formed on) the end portion 6A of the fastening ring 6 as to protrude in the radial outer direction, and a hole portion 41 is formed through the protruding piece portion 43. The hole portion 41 is punched in the axial direction. And, the configuration of the hole portion 41 is approximately polygonal in Figures, a side 41A on a radial inner position is disposed as to approximately correspond to a circular peripheral end edge of the fastening ring 6 to make the toggle member 11 easily deformed in a diminished state shown in FIG. 35.

And, in the toggle member 11, a small convex portion (small shaft portion) 42 is formed on the foot side end portion 11C as to protrude in the axial direction, and the small convex portion (small shaft portion) 42 is loosely fit to the hole portion 41 of the fastening ring 6. As described above, the hitching-connecting means W is shown as to be composed of the hole portion 41 and the small convex portion 42 in FIGS. 34 through 38, and the fastening ring 6 and the toggle member 11 are unitized in the connected state (fit state). The unitization solves problems that parts are lost, parts are fallen in assembly and fastening work, and work is not smoothly conducted when the fastening ring 6 and the toggle member 11 are freely separated as shown in the first through third embodiments (FIGS. 1 through 33).

And, as shown in FIGS. 34 through 37, (without forming the thin portion 13 described with FIGS. 14 through 16) using metal having relatively high strength. (for example, high tension steel without heat processing), rather thin plate material is formed in arc shape as in FIG. 37(B) with uniform thickness, the triangular toggle member 11 protruding in the radial outer direction is made by plastic work forming the central peak portion 12 as in FIG. 36(B), and the diminished state (completed state of pipe connection) of the fastening ring 6 as shown in FIGS. 35 and 37 is made by screwing the nut 5 along the bolt rod 4 inserted to the hole portion 15 (refer to FIGS. 1, 2, etc.). As shown with two-dot broken lines in FIGS. 36 and 37, it is also preferable to form a notch (small concave portion) 12A notched on a central portion of a front side and a rear side to make the central peak portion 12 easy to be formed by plastic work as in FIG. 36(B).

Although not shown in Figures, in the toggle member 11 having the configuration shown in FIGS. 14 through 16, the thin portion 13 may be omitted to make the thickness uniform. And, in the toggle member 11 shown in FIG. 16, the thin portion 13 may be omitted to make the thickness uniform, and the notch (small concave portion) 12A may be formed on the center of the front side and the rear side (as shown with two-dot broken lines in FIG. 16).

Next, FIGS. 39 through 45 show a fifth embodiment of the present invention showing only principal construction parts extracted, and other constructions of the above-described FIGS. 1 through 38 are freely combined. Further, although the bolt rod 4 described with FIGS. 23 through 26 is shown, the bolt rod 4 of FIG. 1 through 22, or of FIGS. 28 through 33 may be used.

In the fifth embodiment, the fastening ring 6 is wound approximately for 360° into a ring, and the end portions 6A are continued to straight portions 6B gradually parting from an inner peripheral circle 37 of the ring portion wound approximately for 360° (extending in tangential direction) in the radial outer direction. When the toggle member 11 (shown in FIGS. 36 and 37) is connected to the hole portion 41 of the protruding piece portions 43, the strong force, given through the small convex portion 42 of the toggle member 11, includes not only the force in peripheral direction working purely as the fastening force, but also component in the radial inner direction. Therefore, in the first through fourth embodiments, the inner edge portion of the end portion 6A of the fastening ring 6 strongly presses or bites into the peripheral face of the pipe P, large resistant force is generated, and effective force (in the peripheral direction) of the fastening ring 6 to fasten the pipe P may be reduced.

Figure 39:
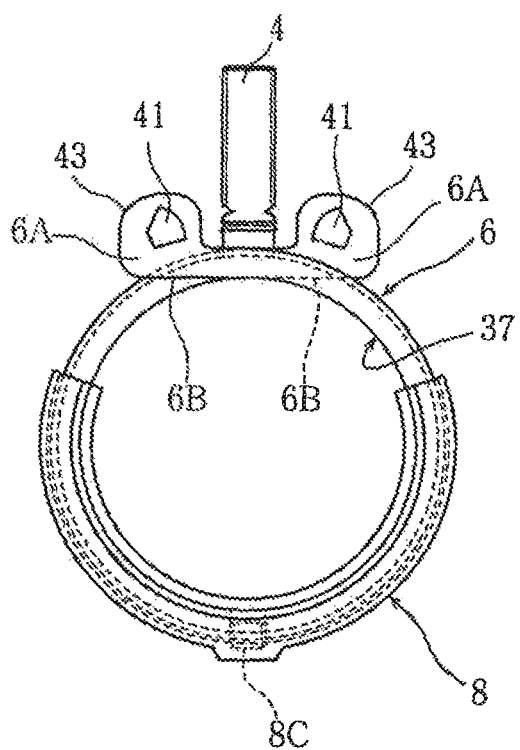
FIG. 39 A front view of principal construction showing a fifth embodiment.

By extending the straight portions 6B as shown in FIGS. 39 and 41 to part the end portion 6A from the peripheral face of the pipe P to be inserted, generation of the resistant force is prevented, and effective strong fastening force in the peripheral direction is obtained.

And, in the fifth embodiment, there are characteristics in that the straight portions 6B of the fastening ring 6 part from the inner peripheral circle 37, and an L-shaped hitching piece 38 is protruding on the opposite side for 180° in the axial direction. Further, a hitching concave portion 8C is formed on the guiding member 8, and the hitching piece 38 hitches to the concave portion 8C as in FIG. 40. The concave portion 8C is disposed on a center opposite to the opening side of the C-shaped guiding member 8, namely, the center on the lower end in FIG. 39, and in the pair of fastening rings 6, the L-shaped hitching pieces 38 are disposed in mutually approaching direction and symmetric.

Figure 44:
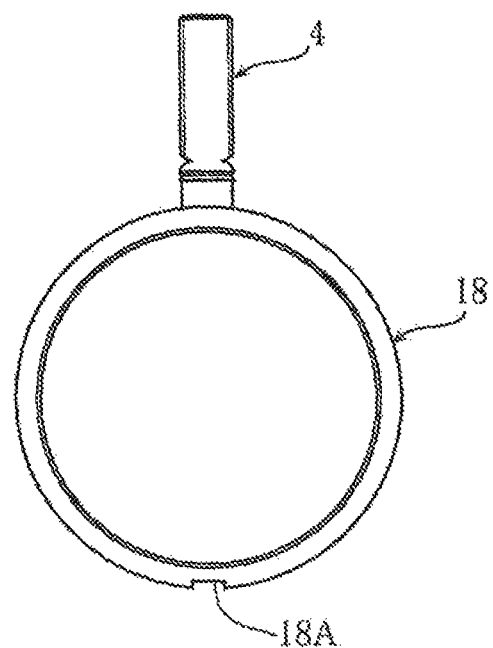
FIG. 44 A front view showing the unified bolt rod and ring portion used in FIG. 40.
Figure 45:
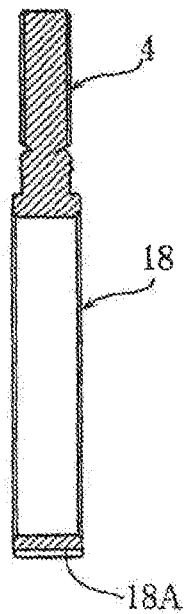
FIG. 45 A central longitudinal cross-sectional view of FIG. 44.

And, as shown in FIGS. 44 and 45, in the ring portion 18, a hitching concave groove 18A is formed (for the whole width in the axial direction) on the peripheral face opposite to the bolt rod 4 for 180°. The hitching piece 38 of the fastening ring 6 hitches to the hitching concave groove 18A as shown in FIG. 40.

Figure 40:
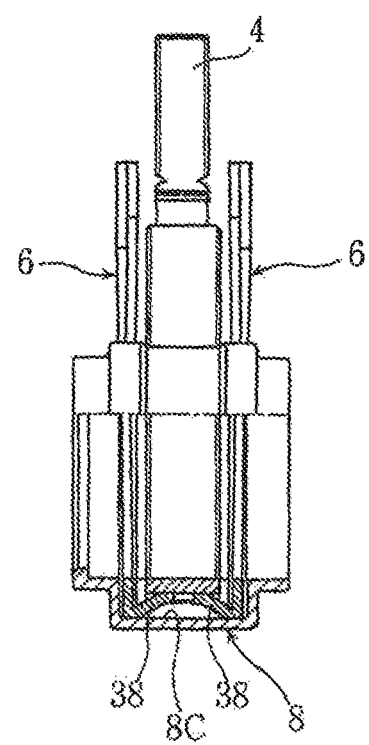
FIG. 40 A side view with partial cross section.

Therefore, in the attached state in FIGS. 39 and 40, the guiding member 8, the fastening ring 6, the ring portion 18, and the bolt rod 4 can be kept in the hitched state (positioning) as not to rotate each other in the peripheral direction.

As shown in FIG. 34, when the toggle member 11 and the pair of fastening rings 6 are preliminarily assembled and the toggle member 11 is assembled as a sub unit not shown in FIGS. 39 and 40, mutual positions of the parts in the peripheral direction can be automatically determined, and attachment and assembly works are made remarkably easy. Further, the toggle member 11 can be uniformly fastened without dislocation in the peripheral direction when fastened by the bolt-nut connection X, the fastening work is made easier, and working efficiency is improved.

In FIGS. 39 through 45, the toggle member 11 is shown with the configuration shown in FIGS. 34, 36, and 37. Instead of that, when the toggle member 11 described with FIGS. 1 through 33 is used and the hitching claw portions 7 are (without using the protruding piece portion 43 having the hole portion 41 shown in FIGS. 39 and 41) protruding from the forth ends of the straight portions 6B to mutually hitch (not shown in Figures), the above-described facilitation of the fastening work and improvement effect of working efficiency are greater.

Next, FIGS. 46 through 50 show a sixth embodiment of the present invention showing only principal construction parts extracted, and other constructions of the above-described FIGS. 1 through 38 are freely combined. Further, although the bolt rod 4 described with FIGS. 23 through 26 is used, the bolt rod 4 of FIGS. 1 through 22, or of FIGS. 28 through 33 may be used.

In the sixth embodiment, the fastening ring 6 is approximately similar to that of the fifth embodiment as a whole, and redundant explanation is omitted because same marks show a similar construction. A different point that a hitching notched concave portion 39 is formed instead of the L-shaped hitching piece 38 (shown in FIGS. 41 and 42).

In the sixth embodiment, in comparison with the first through fourth embodiments, the fastening ring 6 has the straight portions 6B parting from the inner peripheral circle 37 (extending in the tangential direction), and the notched concave portion 39 is formed.

And, in the guiding member 8, as shown in FIGS. 49(A) and (C), a hitching protruding portion 10A is protruding from the bottom of the deep groove 10 opposite to the opening side to fill one portion of the deep groove 10, and the relative positioning of the guiding member 8 and the fastening ring 6 in the peripheral direction is made by the hitching notched concave portion 39 hitching to the hitching protruding portion 10A. The hitching protruding portion 10A is disposed on the center opposite to the opening side of the C-shaped guiding member 8, namely, the center on the lower end in FIG. 46.

Figure 50:
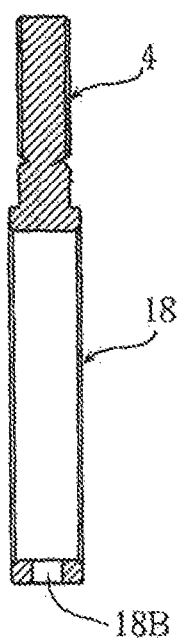
FIG. 50 A front view showing the unified bolt rod and ring portion used in FIG. 47.

And, as shown in FIG. 50, in the ring portion 18, a hitching through hole 18B is formed in the radial direction on the peripheral face opposite to the bolt rod 4 for 180°, and, as shown in FIGS. 49(A) and (B), a hitching protrusion 9A is protruding from the wide groove opposite to the opening side and the relative positioning of the ring portion 18 and the guiding member 8 in the peripheral direction is made by insertion of the hitching protrusion 9A to the through hole 18B.

Figure 46:
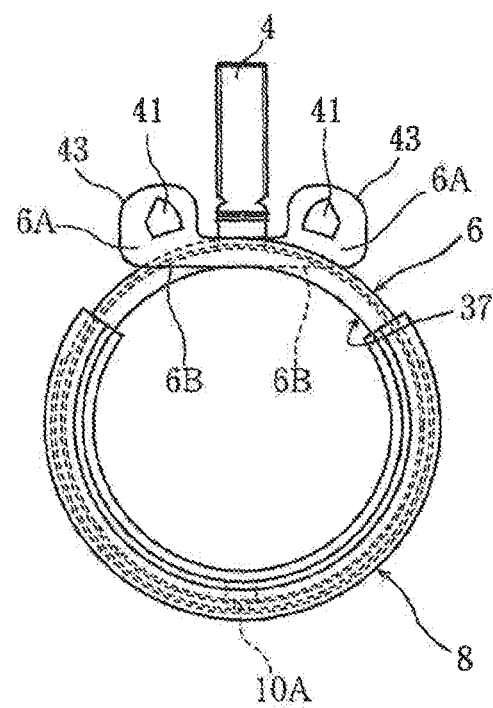
FIG. 46 A front view of principal construction showing a sixth embodiment.
Figure 47:
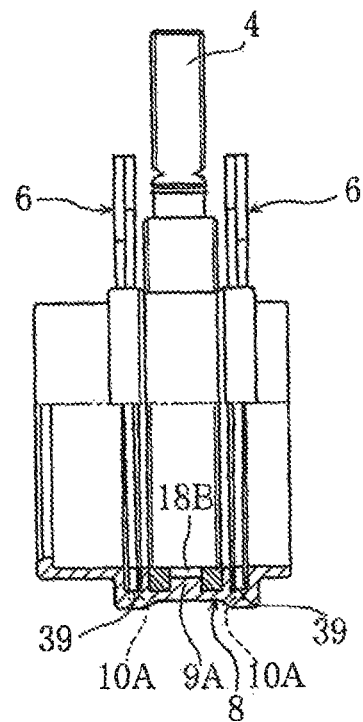
FIG. 47 A side view with partial cross section.

Therefore, in the attached state in FIGS. 46 and 47, the guiding member 8, the fastening ring 6, the ring portion 18, and the bolt rod 4 can be kept in the hitched state (positioning) as not to rotate each other in the peripheral direction.

As shown in FIG. 34, when the toggle member 11 and the pair of fastening rings 6 are preliminarily assembled and the toggle member 11 is assembled as a sub unit not shown in FIGS. 46 and 47, mutual positions of the parts in the peripheral direction can be automatically determined, and attachment and assembly works are made remarkably easy. Further, the toggle member 11 can be uniformly fastened without dislocation in the peripheral direction when fastened by the bolt-nut connection X, the fastening work is made easy, and working efficiency is improved.

In FIGS. 46 through 50, the toggle member 11 is shown with the configuration shown in FIGS. 34, 36, and 37. Instead of that, when the toggle member 11 described with FIGS. 1 through 33 is used and the hitching claw portions 7 are (without using the protruding piece portion 43 having the hole portion 41 shown in FIGS. 46 and 48) protruding from the forth ends of the straight portions 6B to mutually hitch (not shown in Figures), efficiency of fastening work is improved greatly further along with stability of mutual postures of the parts by the above-described positioning in the peripheral direction.

Returning to FIG. 37 to additionally explain the toggle member 11, a small protruding piece 42A is protruding from the small convex portion 42 to the left side of the figure. It also preferable to form an L-shaped hitching piece with the small convex portion 42 and the small protruding piece 42A as to freely hitch to the protruding piece portion 43 of the fastening ring 6 to restrict oscillation around the bolt rod 4 as a center to make the assemble work and the fastening work easy.

And, in the present invention, the center angle $\alpha$ is defined as a range forming the inner peripheral circle 37 as shown in FIGS. 41, 48, 9, and 10. Therefore, measurement of the center angle $\alpha$ is conducted except the straight portions 6B parting from the inner peripheral circle 37.

As described above, the present invention can fasten the fastening ring 6 with small torque (against the pipe) strongly (with diminishing in diameter), sealing ability is enhanced, and pipe dropping accident can be prevented in advance because the plural fastening rings 6 vertically wound for the predetermined center angle $\alpha$ of 360° to 480°, the guiding member 8 holding the fastening rings 6 as to restrict falling of the fastening rings 6 and allow diminishing deformation, the approximately triangular toggle member 11 disposed to protrude in the radial outer direction from the fastening rings 6 in the pipe unconnected state, and the bolt-nut connection X for moving a central peak portion 12 of the toggle member 11 in the radial inner direction as to reduce the height dimension H of the toggle member 11, are provided; and the hitching-connecting means W to make each of the foot side end portions 11C of the toggle member 11 hitched or connected to each of the end portions 6A of the fastening ring 6 is provided, and the end portions 6A of the fastening ring 6 is moved in the peripheral direction through the hitching-connecting means W to diminish the fastening ring 6 in diameter when the central peak portion 12 of the toggle member 11 is moved in the radial inner direction as to reduce the height dimension H of the toggle member 11.

Especially, when PEX pipes (bridged polyethylene pipe) of large diameter and thickness, semi hard pipes, compound pipes, etc. are connected, although large torque was formerly required, the force from the bolt-nut connection X in the radial direction can be efficiently transformed to the force in the peripheral direction (strutting force, namely pipe-fastening force) by magnification function of the toggle member 11. Then, the maximum strutting force in the peripheral direction (the fastening force of the fastening ring 6) can be given when the final pipe connection is completed. And, the vertically wound fastening rings 6 are fastened to strongly bite into the pipe P. Further, portable electric tools can be used as working tools. And, the joint is useful for the compactness. Especially, the outer diameter dimension of the fastening ring 6 is small after the pipe fastening is completed. And, sealing members may be unnecessary for the inserted cylinder portion 1 in some cases because large pipe-fastening force can be obtained.

And, the construction and the configuration of the pipe joint is made simple and easy to make because the hitching-connecting means W is composed of the hitching claw portion 7 protruding from each of the end portions 6A of the fastening ring 6 in the radial outer direction, and an edge 40 of each of the foot side end portions 11C of the toggle member 11.

And, in assembly work of the pipe joint or pipe connection work, the toggle member 11 can be prevented from falling and being lost. And, pipe connection work can be conducted easily and swiftly because the hitching-connecting means W is composed of the hole portion 41 formed through each of the end portions 6A of the fastening ring 6, and the small convex portion 42 formed protruding from each of the foot side end portions 11C of the toggle member 11 and inserted to the hole portion 41 as to loosely fit.

And, the protruding portion (bolt rod) in the radial direction disappears after the bolt-nut connection X is fastened to the final fastening position, the pipe joint, after the piping is completed, is made remarkably compact, and (along with the above conditions) heat insulating material, protection sheet, etc. can be easily wound because the cylindrical substitute member 21 is mounted to the bolt rod 4 composing the bolt-nut connection X, the substitute member 21 plastically deforms to keep the deformed configuration of the toggle member 11 when the bolt-nut connection X is fastened, and the bolt rod 4 is parted when the bolt-nut connection X is fastened to the final fastening position and reached for the predetermined fastening torque $T_0$. And, it is easy to confirm that the nut member 5 is sufficiently fastened. And, mischief can be prevented, and the nut member 5 is not screwed off by mischief. And, the pipe joint can be easily and economically made.

And, the protruding portion (the forth end portion of the bolt rod beyond the notch 25) in the radial direction disappears after the bolt-nut connection X is fastened to the final fastening position, the pipe joint, after the piping is completed, is made remarkably compact, and (along with the above conditions) heat insulating material, protection sheet, etc. can be easily wound because the bolt rod 4 composing the bolt-nut connection X has the hitching protrusion 24 in the peripheral direction and the notch 25 on the forth end side to the hitching protrusion 24, the base end portion 17 of the bolt rod 4 is continued to the ring portion 18 having the inner diameter $D_1$, larger than an outer diameter $D_0$ of the pipe P to be connected, and held by the guiding member 8, the washer 22 is disposed between the nut member 5 composing the bolt-nut connection X and the toggle member 11, the washer 22 has the hitching claw piece portion 27 on the inner peripheral side, the bolt rod 4 breaks at the notch 25 to part and the hitching claw piece portion 27 hitches to the hitching protrusion 24 to restrict movement of the thin plate ring 28 in the radial outer direction as to keep the deformed configuration of the toggle member 11 when the bolt-nut connection X is fastened to the final fastening position and reached for the predetermined fastening torque $T_0$. And, it is easy to confirm that the nut member 5 is sufficiently fastened. And, mischief can be prevented, and the nut member 5 is not screwed off by mischief. And, the pipe joint can be easily and economically made.

And, the protruding portion (the forth end portion of the bolt rod beyond the notch 25) in the radial direction disappears after the bolt-nut connection X is fastened to the final fastening position, the pipe joint, after the piping is completed, is made remarkably compact, and (along with the above conditions) heat insulating material, protection sheet, etc can be easily wound because the bolt rod 4 composing the bolt-nut connection X has the notch 25, the base end portion 17 of the bolt rod 4 is continued to the ring portion 18 having the inner diameter $D_1$, larger than the outer diameter $D_0$ of the pipe P to be connected, and held by the guiding member 8, the cylindrical hitching member 33 having the hitching claw portion 32 on the peripheral face 31 is mounted to the bolt rod 4 and unified with the ring portion 18 or the base end portion 17 of the bolt rod 4, the washer 22 is disposed between the nut member 5 composing the bolt-nut connection X and the toggle member 11, the hitched portion 35 to which the hitching claw portion 32 hitches is formed on the inner peripheral face 34 of the washer 22, the bolt rod 4 breaks at the notch 25 to part and the hitching claw portion 32 hitches to the hitched portion 35 to restrict movement of the washer 22 in the radial outer direction as to keep the deformed configuration of the toggle member 11 when the bolt-nut connection X is fastened to the final fastening position and reached for the predetermined fastening torque $T_0$. And, it is easy to confirm that the nut member 5 is sufficiently fastened. And, mischief can be prevented, and the nut member 5 is not screwed off by mischief. And, the pipe joint can be easily and economically made.

And, heat insulating material, protection sheet, etc, can be easily wound compact after the pipe connection is completed because the fastening ring 6 which can be diminished in diameter, the approximately triangular toggle member 11 disposed to protrude in the radial outer direction from the fastening ring 6 in the pipe unconnected state, and the bolt-nut connection X for moving the central peak portion 12 of the toggle member 11 in the radial inner direction as to reduce the height dimension H of the toggle member 11, are provided; and the bolt rod 4 composing the bolt-nut connection X is parted by drawing or cutting breakage when the bolt-nut connection X is fastened to the final fastening position and reached for the predetermined fastening torque $T_0$ as to reduce the protruding length of the bolt rod 4 in radial direction. Further, in case that plural pipes are disposed neighboring and parallel, intervals between the pipes can be reduced.

EXPLANATION OF THE MARKS

4 A bolt rod
5 A nut member
6 A fastening member
6A An end portion
7 A hitching claw portion
8 A guiding member
11 A toggle member
11C A foot side end portion
12 A central peak portion
17 A base end portion
18 A ring portion
21 A substitute member
22 A washer
24 A hitching protrusion
25 A notch
27 A hitching claw piece portion
28 A thin plate ring
31 A peripheral face
32 A hitching claw portion
33 A cylindrical hitching member
34 An inner peripheral face
35 A hitched portion
40 An edge
41 A hole portion
42 A small convex portion
$D_0$ An outer diameter
$D_1$ An inner diameter H A height dimension
P A pipe
T₀ A predetermined fastening torque
X A bolt-nut connection
W A hitching-connecting means
α A predetermined center angle

The invention claimed is:

1. A pipe joint, comprising:
a plurality of fastening rings each of which is wound a predetermined center angle of 360° to 480°, a guiding member holding the fastening rings concentrically around a cylindrical portion, the cylindrical portion being inserted into a pipe, the guiding member restricts falling of the fastening rings and allows diminishing deformation of the fastening rings, an approximately triangularly-shaped toggle member abuttingly protruding in a radially outer direction from the fastening rings in a pipe unconnected state, and a radially extending bolt-nut connection that extends through and moves a central peak portion of the toggle member in a radial inner direction for reducing a height dimension of the toggle member when the central peak portion thereof moves in the radial inward direction, each of the fastening rings having end portions and the toggle member having foot side end portions which abut each other, and
the end portions being radially extending protrusions to make each of the foot side end portions of the toggle member hitched in abutment to each of the end portions of the fastening ring, and the end portions of the fastening ring is moved in a peripheral direction through the radially extending protrusions to diminish the fastening ring in a diameter when the central peak portion of the toggle member is moved in the radial inner direction as to reduce the height dimension of the toggle member,
wherein when the nut of the bolt-nut connection moves radially inwards along the bolt towards the fastening rings, the nut causes the central peak portion to move inwards radially toward the fastening rings and at the same time, the toggle member reduces the diameter of the fastening rings around the cylindrical portion, and
wherein an inner periphery of the toggle member moves towards the outer periphery of the fastening ring.

2. The pipe joint as set forth in claim 1, wherein the radially extending protrusions are composed of a hitching claw portion protruding from each of the end portions of the fastening ring in the radial outer direction, and an edge of each of the foot side end portions of the toggle member.

3. The pipe joint as set forth in claim 1, wherein the radially extending protrusions are composed of a hole portion formed through each of the end portions of the fastening ring, and a small convex portion formed protruding from each of the foot side end portions of the toggle member and inserted to the hole portion.

4. The pipe joint as set forth in claim 1, wherein a cylindrical substitute member is mounted to a bolt rod composing the bolt-nut connection, the substitute member plastically deforms to keep a deformed configuration of the toggle member when the bolt-nut connection is fastened, and the bolt rod is parted when the bolt-nut connection is fastened to a final fastening position and reached for a predetermined fastening torque.

5. The pipe joint as set forth in claim 1, wherein a bolt rod composing the bolt-nut connection has a hitching protrusion in the peripheral direction and a notch on a forth end side to the hitching protrusion, a base end portion of the bolt rod is continued to a ring portion having an inner diameter, larger than an outer diameter of a pipe to be connected, and held by the guiding member, a washer is disposed between a nut member composing the bolt-nut connection and the toggle member, the washer has a thin plate ring on a radial inner side, the thin plate ring has a hitching claw piece portion on an inner peripheral side, the bolt rod breaks at the notch to part and the hitching claw piece portion hitches to the hitching protrusion to restrict movement of the thin plate ring in the radial outer direction as to keep a deformed configuration of the toggle member when the bolt-nut connection is fastened to a final fastening position and reached for a predetermined fastening torque.

6. The pipe joint as set forth in claim 1, wherein a bolt rod composing the bolt-nut connection has a notch, a base end portion of the bolt rod is continued to a ring portion having an inner diameter, larger than an outer diameter of a pipe to be connected, and held by the guiding member, a cylindrical hitching member having a hitching claw portion on a peripheral face is mounted to the bolt rod and unified with the ring portion or the base end portion of the bolt rod, a washer is disposed between a nut member composing the bolt-nut connection and the toggle member, a hitched portion to which the hitching claw portion hitches is formed on an inner peripheral face of the washer, the bolt rod breaks at the notch to part and the hitching claw portion hitches to the hitched portion to restrict movement of the washer in the radial outer direction as to keep a deformed configuration of the toggle member when the bolt-nut connection is fastened to a final fastening position and reached for a predetermined fastening torque.

7. The pipe joint as set forth in claim 1, wherein the toggle member substantially corresponds to a radial shape of the fastening ring.

* * * * *